(12) United States Patent
Hu et al.

(10) Patent No.: US 12,425,268 B2
(45) Date of Patent: Sep. 23, 2025

(54) DATA TRANSMISSION METHOD, PROCESSOR SYSTEM, AND MEMORY ACCESS SYSTEM

(71) Applicant: HUAWEI TECHNOLOGIES CO., LTD., Guangdong (CN)

(72) Inventors: Yao Hu, Hangzhou (CN); Pei Wu, Hangzhou (CN); Xiaoping Zhu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 10 days.

(21) Appl. No.: 18/146,720

(22) Filed: Dec. 27, 2022

(65) Prior Publication Data

US 2023/0132302 A1    Apr. 27, 2023

Related U.S. Application Data

(63) Continuation of application No. PCT/CN2021/093981, filed on May 15, 2021.

(30) Foreign Application Priority Data

Jun. 28, 2020  (CN) .......................... 202010599682.8
Sep. 30, 2020  (CN) .......................... 202011063642.8

(51) Int. Cl.
*H04L 12/46*    (2006.01)
*G06F 9/30*     (2018.01)
(Continued)

(52) U.S. Cl.
CPC ...... *H04L 12/4633* (2013.01); *G06F 9/30101* (2013.01); *G06F 15/17331* (2013.01)

(58) Field of Classification Search
CPC .......................... G06F 12/0246; G06F 3/0659
See application file for complete search history.

(56) References Cited

U.S. PATENT DOCUMENTS

2013/0290647 A1* 10/2013 Maeda ............... G06F 12/0246
                                                          711/149
2015/0032841 A1*  1/2015 Vasudevan ........... G06F 3/0613
                                                          709/216
(Continued)

FOREIGN PATENT DOCUMENTS

CN     108494817 A     9/2018
WO     2020001459 A1   1/2020

OTHER PUBLICATIONS

Extended European Search Report in European Appln No. 21832036.4, dated Nov. 3, 2023, 10 pages.

*Primary Examiner* — Getente A Yimer
(74) *Attorney, Agent, or Firm* — Fish & Richardson P.C.

(57) ABSTRACT

Example data transmission methods, processor systems, and memory access systems are provided. One example processor system is applied to a source end device. The processor system includes a processor core and a first remote direct memory access (RDMA) network interface card. The processor core is configured to deliver a memory write instruction. The memory write instruction includes to-be-written data and a destination address of the to-be-written data. The destination address is a memory address of a destination end device. The first RDMA network interface card is configured to encapsulate the to-be-written data based on the destination address of the to-be-written data and configuration information of the destination end device and send the encapsulated to-be-written data to a second RDMA network interface card of the destination end device.

17 Claims, 10 Drawing Sheets

(51) Int. Cl.
  *G06F 13/16* (2006.01)
  *G06F 13/28* (2006.01)
  *G06F 15/173* (2006.01)
  *H04L 67/1095* (2022.01)

(56) References Cited

U.S. PATENT DOCUMENTS

| | | |
|---|---|---|
| 2015/0039712 A1 | 2/2015 | Frank et al. |
| 2018/0067893 A1* | 3/2018 | Raindel ............. G06F 15/17331 |
| 2018/0139281 A1* | 5/2018 | Das ..................... H04L 67/1097 |
| 2019/0243552 A1* | 8/2019 | Maharana ............... G06F 12/00 |
| 2019/0294582 A1* | 9/2019 | Zhu ..................... H04L 67/1097 |
| 2020/0050551 A1* | 2/2020 | He ........................ G06F 3/0659 |

* cited by examiner

DATA TRANSMISSION METHOD, PROCESSOR SYSTEM, AND MEMORY ACCESS SYSTEM

CROSS-REFERENCE TO RELATED APPLICATIONS

This application is a continuation of International Patent Application No. PCT/CN2021/093981, filed on May 15, 2021, which claims priority to Chinese Patent Application No. 202010599682.8, filed on Jun. 28, 2020, and Chinese Patent Application No. 202011063642.8, filed on Sep. 30, 2020. All of the aforementioned patent applications are hereby incorporated by reference in their entireties.

TECHNICAL FIELD

Embodiments of this application relate to the computer storage field, and in particular, to a data transmission method, a processor system, and a memory access system.

BACKGROUND

Remote direct memory access (RDMA) is a network interface card technology that implements fast memory access between devices through an RDMA network interface card.

For example, a computer 1 and a computer 2 perform memory access based on an RDMA technology. For structures of the computer 1 and the computer 2, refer to FIG. 1. When the computer 1 writes data to a memory of the computer 2, a processor core 11 of the computer 1 stores a write task in a memory 12 of the computer 1, and then the processor core 11 of the computer 1 assembles, based on a specified communication protocol, data corresponding to a local memory, and notifies an RDMA network interface card 13 of the computer 1 to write the data to the memory 22 of the computer 2. When the computer 1 reads the data in the memory of the computer 2, the processor core 11 of the computer 1 stores a read task in the memory 12, and then the processor core 11 notifies the RDMA network interface card 13 to read the data from the memory 22 of the computer 2. Further, an RDMA network interface card 23 of the computer 2 reads the data (the data is assembled by a processor core of the computer 2 based on a specified communication protocol) from the memory 22, and returns the data to the RDMA network interface card 13. The RDMA network interface card 13 writes the data to the memory 12 of the computer 1. Subsequently, the processor core 11 may read the data from the memory 12.

However, in the foregoing memory access process, for both data read and data write, the processor core needs to assemble data, and a memory access latency is still large.

SUMMARY

Embodiments of this application provide a data transmission method, a processor system, and a memory access system, to remotely reduce a memory access latency.

To achieve the foregoing objectives, the following technical solutions are used in embodiments of this application.

According to a first aspect, an embodiment of this application provides a processor system, applied to a source end device. The processor system includes a processor core and a first RDMA network interface card. The processor core is configured to deliver a memory write instruction. The memory write instruction includes to-be-written data and a destination address of the to-be-written data, and the destination address of the to-be-written data is a memory address of a destination end device. The first RDMA network interface card is configured to: encapsulate the to-be-written data based on the destination address of the to-be-written data and configuration information of the destination end device; and send encapsulated to-be-written data to a second RDMA network interface card of the destination end device, so that the second RDMA network interface card writes the to-be-written data to a memory of the destination end device.

In the processor system provided in this embodiment of this application, the processor core of the source end device sends the memory write instruction to an RDMA network interface card of the source end device, and the memory write access instruction carries the memory address (the destination address of the to-be-written data) of the destination end device. In this way, the to-be-written data does not need to be written to a local memory, but data exchange is implemented between the processor core and the RDMA network interface card. Then, the RDMA network interface card encapsulates the to-be-written data (that is, the network interface card performs an encapsulation action after receiving the memory write instruction instead of based on a notification of the processor core), and maintains a data structure of a communication protocol. Compared with the conventional technology, in this embodiment, the processor core of the source end device does not need to run complex application software to encapsulate the to-be-written data, and does not need to maintain the data structure of the communication protocol. Therefore, a latency of remote memory access can be reduced.

In addition, because the processor core does not need to encapsulate the to-be-written data, overheads of the processor core can be reduced, and computing power resources of the processor core can be saved.

In a possible implementation, the configuration information of the destination end device includes at least an address of the destination end device and/or an address of the second RDMA network interface card. The first RDMA network interface card is further configured to obtain the configuration information of the destination end device.

In this embodiment of this application, before memory access is performed between the source end device and the destination end device, initialization configuration is separately performed on the source end device and the destination end device, including configuring information such as an address of each device and an address of an RDMA network interface card on the device, so that the source end device and the destination end device interact with each other, and send respective information such as the device address and the address of the RDMA network interface card to each other, to perform data encapsulation or decapsulation based on configuration information of the peer end during subsequent memory access.

In a possible implementation, the processor system further includes an interconnection bus, the interconnection bus is connected to the processor core and at least one RDMA network interface card, and the at least one RDMA network interface card includes the first RDMA network interface card. The interconnection bus is configured to: receive the memory write instruction delivered by the processor core, determine, from the at least one RDMA network interface card based on a first mapping relationship, the first RDMA network interface card corresponding to the destination address of the to-be-written data, and send the to-be-written data to the first RDMA network interface card. The first mapping relationship is a mapping relationship between an address window and an address of an RDMA network interface card.

The interconnection bus is used to perform address mapping on the memory write instruction delivered by the processor core of the source end device, to smoothly forward the memory write instruction to a corresponding RDMA network interface card.

In a possible implementation, the interconnection bus is specifically configured to: determine a first address window to which the destination address of the to-be-written data belongs, and determine, from the at least one RDMA network interface card based on the first mapping relationship, the first RDMA network interface card corresponding to the first address window.

In a possible implementation, the processor system further includes a memory, and the memory is connected to the interconnection bus. A memory of the source end device and a memory of the destination end device are addressed uniformly; or a memory of the source end device and a memory of the destination end device are not addressed uniformly.

In a possible implementation, when the memory of the source end device and the memory of the destination end device are not addressed uniformly, the first RDMA network interface card is further configured to translate the destination address of the to-be-written data based on a second mapping relationship. The second mapping relationship is a mapping relationship between a first memory address and a second memory address. The destination address of the to-be-written data is the first memory address, the first memory address is a mapping address obtained after the memory of the destination end device is mapped to address space of the source end device, a translated destination address is the second memory address, and the second memory address is a local address of the memory of the destination end device. The first RDMA network interface card is specifically configured to encapsulate the to-be-written data based on the translated destination address and the configuration information of the destination end device.

When the memory of the source end device and the memory of the destination end device are not addressed uniformly, a memory address of the source end device may conflict with the memory address of the destination end device. Therefore, when the processor core of the source end device delivers the memory write instruction, after the first RDMA network interface card of the source end device receives the write instruction, the first RDMA network interface card cannot identify whether a memory address in the write instruction is the memory address of the source end device or the memory address of the destination end device. As a result, memory access may fail. In this embodiment of this application, the first RDMA network interface card performs address translation on a destination address of memory access by using address mapping, to resolve an address conflict problem, so that memory access can be successfully completed.

In a possible implementation, the processor system further includes a direct access port, and the processor core is connected to the interconnection bus through the direct access port. The direct access port is configured to: receive the memory write instruction from the processor core, add a timestamp to the memory write instruction, start a timer in the direct access port, and send the memory write instruction to the interconnection bus.

In this way, when receiving a plurality of instructions, the destination end device (which is specifically a memory controller of the destination end device) may sequentially process the plurality of instructions based on timestamp information of the instructions, that is, based on a time sequence of the instructions, to avoid congestion. Optionally, a length of the time register is 64 bits.

In a possible implementation, the direct access port is specifically configured to: stop the timer if receiving a response message of the second RDMA network interface card before the timer expires; or report timeout response information to the processor core if not receiving a response message of the second RDMA network interface card when the timer expires.

In this embodiment of this application, when an exception such as timeout or jitter occurs in the memory write instruction, and the direct access port does not receive the response message when the timer expires, the direct access port reports the timeout response message to the processor core. In this case, the processor core responds to the timeout case, to avoid suspension of the processor core.

In a possible implementation, the memory write instruction includes one instruction, and the to-be-written data is data in a register of the processor core. The processor core reads the to-be-written data from the register, carries the to-be-written data and the memory address (that is, the destination address) of the destination end device in the memory write instruction, and delivers the memory write instruction to notify another module to write the to-be-written data to memory space corresponding to the destination address in the memory of the destination end device.

Optionally, a data length supported by the register of the processor core may be 64 bits, and the register of the processor core also supports length extension.

In a possible implementation, the memory write instruction includes a first instruction and a second instruction. The processor core is specifically configured to: deliver the first instruction, where the first instruction includes the to-be-written data and a first address; and deliver the second instruction, where the second instruction includes the destination address of the to-be-written data and a second address. The first address and the second address are addresses in a register in the first RDMA network interface card. The first address is an address that is in the register in the first RDMA network interface card and that is used to store the to-be-written data, and the second address is an address that is in the register in the first RDMA network interface card and that is used to store the destination address of the to-be-written data. The first RDMA network interface card is specifically configured to: write the to-be-written data to the register in the first RDMA network interface card based on the first address in the first instruction, write the destination address of the to-be-written data to the register in the first RDMA network interface card based on the second address in the second instruction, encapsulate the to-be-written data based on the destination address of the to-be-written data in the register, and send the encapsulated to-be-written data to the second RDMA network interface card of the destination end device, so that the second RDMA network interface card writes the to-be-written data to the memory of the destination end device.

In this embodiment of this application, when the first RDMA network interface card detects that the to-be-written data and the destination address of the to-be-written data are stored in a specified address in the register of the first RDMA network interface card (that is, storage space corresponding to the first address stores the to-be-written data, and storage space corresponding to the second address stores the destination address of the to-be-written data), the first RDMA network interface card writes the to-be-written data to the memory space corresponding to the destination address in the memory of the destination end device.

In a possible implementation, a protocol for encapsulating the to-be-written data includes one of the following: an RDMA protocol, a TCP protocol, an IP protocol, or an InfiniBand protocol. In this embodiment of this application, specific content of information required for encapsulating the to-be-written data is related to an encapsulation protocol. For different encapsulation protocols, content of the information required for encapsulating the to-be-written data may be different.

In a possible implementation, the first RDMA network interface card is further configured to: after receiving the response message of the second RDMA network interface card, maintain a data structure of a data encapsulation protocol on the first RDMA network interface card (which may be understood as updating related configuration information).

According to a second aspect, an embodiment of this application provides a memory access system, including a source end device and a destination end device. A processor system of the source end device includes a processor core and a first remote direct memory access RDMA network interface card, and a processor system of the destination end device includes a second RDMA network interface card and a memory. The processor core of the source end device is configured to deliver a memory read instruction. The memory read instruction includes an address of to-be-read data and a register address, the address of the to-be-read data is a memory address of the destination end device, and the register address is an address in a register of the processor core. The first RDMA network interface card is configured to send, based on the address of the to-be-read data, a read request including an encapsulated register address to the second RDMA network interface card of the destination end device. The second RDMA network interface card of the destination end device is configured to: receive the read request from the first RDMA network interface card, decapsulate the encapsulated register address, read the to-be-read data from the memory of the destination end device based on the address of the to-be-read data, encapsulate the to-be-read data based on the register address in the memory read instruction, and send encapsulated to-be-read data to the first RDMA network interface card. The first RDMA network interface card is further configured to: receive the encapsulated to-be-read data from the second RDMA network interface card, decapsulate the encapsulated to-be-read data, and send decapsulated to-be-read data to the register of the processor core.

In this embodiment of this application, in a data read process, the processor core of the source end device sends the memory read instruction to the RDMA network interface card of the source end device. The memory read access instruction carries the memory address (the address of the to-be-read data) of the destination end device and the register address of the processor core. Similar to a data write process, the processor core does not need to write the address of the to-be-read data and the register address to a local memory, but sends the memory read instruction to the RDMA network interface card of the source end device. Then, the RDMA network interface card of the source end device sends the read request to the RDMA network interface card of the destination end device. The RDMA network interface card of the destination end device reads the to-be-read data from the memory of the destination end device, encapsulates the to-be-read data, and returns the to-be-read data to the RDMA network interface card of the source end device, so that the RDMA network interface card of the source end device and the processor core implement data exchange. It can be learned that the RDMA network interface card of the destination end device encapsulates the to-be-read data, and maintains a data structure of a communication protocol. Compared with the conventional technology, in this embodiment, a processor core of the destination end device does not need to run complex application software to encapsulate the to-be-read data, and does not need to maintain the data structure of the communication protocol. Therefore, a latency of remote memory access can be reduced. In addition, because the processor core does not need to encapsulate the to-be-read data, overheads of the processor core can be reduced, and computing power resources of the processor core can be saved.

In this embodiment of this application, after the processor core of the source end device delivers the memory read instruction, the processor core may execute another instruction in a time period before the to-be-read data is returned to the processor core, so that working efficiency of the processor core can be improved.

In a possible implementation, configuration information of the destination end device includes at least an address of the destination end device and/or an address of the second RDMA network interface card. The first RDMA network interface card is further configured to obtain the configuration information of the destination end device.

In a possible implementation, configuration information of the source end device includes at least an address of the source end device and/or an address of the first RDMA network interface card. The second RDMA network interface card is further configured to obtain the configuration information of the source end device.

In a possible implementation, the processor system of the source end device further includes a direct access port and an interconnection bus, the processor core is connected to the interconnection bus through the direct access port, the interconnection bus is further connected to at least one RDMA network interface card, and the at least one RDMA network interface card includes the first RDMA network interface card. The direct access port of the source end device is configured to: receive the memory read instruction from the processor core, add a timestamp to the memory read instruction, start a timer in the direct access port, and send the memory read instruction to the interconnection bus. The interconnection bus of the source end device is configured to: receive the memory read instruction from the direct access port, determine, from the at least one RDMA network interface card based on a first mapping relationship, the first RDMA network interface card corresponding to the address of the to-be-read data, and send the memory read instruction to the first RDMA network interface card. The first mapping relationship is a mapping relationship between an address window and an address of an RDMA network interface card.

In a possible implementation, the interconnection bus of the source end device is specifically configured to: determine a first address window to which the address of the to-be-read data belongs, and determine, from the at least one RDMA network interface card based on the first mapping relationship, the first RDMA network interface card corresponding to the first address window.

In a possible implementation, the direct access port of the source end device is specifically configured to: stop the timer if receiving the to-be-read data before the timer expires; or report timeout response information to the processor core if not receiving the to-be-read data when the timer expires.

In a possible implementation, the processor system of the source end device further includes a memory, the memory is connected to the interconnection bus. The memory of the source end device and the memory of the destination end device are addressed uniformly; or the memory of the source end device and the memory of the destination end device are not addressed uniformly.

In a possible implementation, when the memory of the source end device and the memory of the destination end device are not addressed uniformly, the first RDMA network interface card is further configured to translate the address of the to-be-read data based on a second mapping relationship. The second mapping relationship is a mapping relationship between a first memory address and a second memory address. The address of the to-be-read data is the first memory address, the first memory address is a mapping address obtained after the memory of the destination end device is mapped to address space of the source end device, a translated destination address is the second memory address, and the second memory address is a local address of the memory of the destination end device. The first RDMA network interface card is specifically configured to: send, based on the translated address, the read request including the encapsulated register address to the second RDMA network interface card of the destination end device.

In a possible implementation, a protocol for encapsulating or decapsulating the to-be-read data includes one of the following: an RDMA protocol, a TCP protocol, an IP protocol, or an InfiniB and protocol.

In a possible implementation, the first RDMA network interface card is further configured to: after receiving the to-be-read data sent by the second RDMA network interface card, maintain a data structure of a data encapsulation protocol on the first RDMA network interface card. The second RDMA network interface card is further configured to: after sending the to-be-read data to the first RDMA network interface card, maintain a data structure of a data encapsulation protocol on the second RDMA network interface card.

According to a third aspect, an embodiment of this application provides a data transmission method, applied to a source end device. The method includes: A processor core of the source end device delivers a memory write instruction. The memory write instruction includes to-be-written data and a destination address of the to-be-written data, and the destination address of the to-be-written data is a memory address of a destination end device. A first RDMA network interface card of the source end device receives the memory write instruction. The first RDMA network interface card encapsulates the to-be-written data based on the destination address of the to-be-written data in the memory write instruction and configuration information of the destination end device. Then, the first RDMA network interface card sends encapsulated to-be-written data to a second RDMA network interface card of the destination end device.

In a possible implementation, before the processor core of the source end device delivers the memory write instruction, the data transmission method provided in this embodiment of this application further includes: The first RDMA network interface card obtains the configuration information of the destination end device. The configuration information of the destination end device includes at least an address of the destination end device and/or an address of the second RDMA network interface card.

In a possible implementation, the data transmission method provided in this embodiment of this application further includes: An interconnection bus of the source end device receives the memory write instruction delivered by the processor core. The interconnection bus determines, from at least one RDMA network interface card based on a first mapping relationship, the first RDMA network interface card corresponding to the destination address of the to-be-written data. The first mapping relationship is a mapping relationship between an address window and an address of an RDMA network interface card. The interconnection bus sends the to-be-written data to the first RDMA network interface card.

In a possible implementation, that the interconnection bus determines, from at least one RDMA network interface card based on a first mapping relationship, the first RDMA network interface card corresponding to the destination address of the to-be-written data specifically includes: The interconnection bus determines a first address window to which the destination address of the to-be-written data belongs, and the interconnection bus determines, from the at least one RDMA network interface card based on the first mapping relationship, the first RDMA network interface card corresponding to the first address window.

In a possible implementation, a memory of the source end device and a memory of the destination end device are addressed uniformly; or a memory of the source end device and a memory of the destination end device are not addressed uniformly.

In a possible implementation, the data transmission method provided in this embodiment of this application further includes: When the memory of the source end device and the memory of the destination end device are not addressed uniformly, the first RDMA network interface card translates the destination address of the to-be-written data based on a second mapping relationship. The second mapping relationship is a mapping relationship between a first memory address and a second memory address, the destination address of the to-be-written data is the first memory address, the first memory address is a mapping address obtained after the memory of the destination end device is mapped to address space of the source end device, a translated destination address is the second memory address, and the second memory address is a local address of the memory of the destination end device.

In a possible implementation, that the first RDMA network interface card encapsulates the to-be-written data based on the destination address of the to-be-written data and configuration information of the destination end device specifically includes: The first RDMA network interface card encapsulates the to-be-written data based on the translated destination address and the configuration information of the destination end device.

In a possible implementation, the data transmission method provided in this embodiment of this application further includes: A direct access port of the source end device receives the memory write instruction from the processor core, adds a timestamp to the memory write instruction, starts a timer in the direct access port, and sends the memory write instruction to the interconnection bus. In this embodiment of this application, the direct access port stops the timer if receiving a response message of the second RDMA network interface card before the timer expires; or the direct access port reports timeout response information to the processor core if not receiving a response message of the second RDMA network interface card when the timer expires.

In a possible implementation, the memory write instruction includes one instruction, and the to-be-written data is data in a register of the processor core. The processor core reads the to-be-written data from the register, carries the to-be-written data and the memory address (that is, the destination address) of the destination end device in the memory write instruction, and delivers the memory write instruction to notify another module to write the to-be-written data to memory space corresponding to the destination address in the memory of the destination end device.

In a possible implementation, that the processor core delivers the memory write instruction includes sending a first instruction and sending a second instruction. The first instruction includes the to-be-written data and a first address; and the second instruction includes the destination address of the to-be-written data and a second address. The first address and the second address are addresses in a register in the first RDMA network interface card. The first address is an address that is in the register in the first RDMA network interface card and that is used to store the to-be-written data, and the second address is an address that is in the register in the first RDMA network interface card and that is used to store the destination address of the to-be-written data. The first RDMA network interface card is specifically configured to: write the to-be-written data to the register in the first RDMA network interface card based on the first address in the first instruction, write the destination address of the to-be-written data to the register in the first RDMA network interface card based on the second address in the second instruction, encapsulate the to-be-written data based on the destination address of the to-be-written data in the register, and send the encapsulated to-be-written data to the second RDMA network interface card of the destination end device, so that the second RDMA network interface card writes the to-be-written data to the memory of the destination end device.

In a possible implementation, a protocol for encapsulating the to-be-written data includes one of the following: an RDMA protocol, a TCP protocol, an IP protocol, or an InfiniBand protocol. In this embodiment of this application, specific content of information required for encapsulating the to-be-written data is related to an encapsulation protocol. For different encapsulation protocols, content of the information required for encapsulating the to-be-written data may be different.

In a possible implementation, after the first RDMA network interface card receives a response message of the second RDMA network interface card, the data transmission method provided in this embodiment of this application further includes: The first RDMA network interface card maintains a data structure of a data encapsulation protocol on the first RDMA network interface card.

According to a fourth aspect, an embodiment of this application provides a data transmission method, applied to a source end device and a destination end device. The method includes: A processor core of the source end device delivers a memory read instruction. The memory read instruction includes an address of to-be-read data and a register address, the address of the to-be-read data is a memory address of the destination end device, and the register address is an address in a register of the processor core. A first RDMA network interface card of the source end device receives the memory read instruction, encapsulates the register address based on the address of the to-be-read data in the memory read instruction and configuration information of the destination end device, and sends a read request including an encapsulated register address to a second RDMA network interface card of the destination end device. Further, the second RDMA network interface card of the destination end device receives the read request from the first RDMA network interface card, decapsulates the encapsulated register address, reads the to-be-read data from a memory of the destination end device based on the address of the to-be-read data, encapsulates the to-be-read data based on the register address and configuration information of the source end device, and sends encapsulated to-be-read data to the first RDMA network interface card. The first RDMA network interface card receives the encapsulated to-be-read data from the second RDMA network interface card, decapsulates the encapsulated to-be-read data, and sends decapsulated to-be-read data to the register of the processor core.

In a possible implementation, before the processor core of the source end device delivers the memory read instruction, the data transmission method provided in this embodiment of this application further includes: The source end device receives the configuration information of the destination end device from the destination end device. The configuration information of the destination end device includes at least an address of the destination end device and/or an address of the second RDMA network interface card. The destination end device receives the configuration information of the source end device from the source end device. The configuration information of the source end device includes at least an address of the source end device and/or an address of the first RDMA network interface card.

In a possible implementation, the data transmission method provided in this embodiment of this application further includes: A direct access port of the source end device receives the memory read instruction from the processor core, adds a timestamp to the memory read instruction, starts a timer in the direct access port, and sends the memory read instruction to an interconnection bus of the source end device. Further, the interconnection bus of the source end device receives the memory read instruction from the direct access port; determines, from at least one RDMA network interface card based on a first mapping relationship, the first RDMA network interface card corresponding to the address of the to-be-read data, where the first mapping relationship is a mapping relationship between an address window and an address of an RDMA network interface card; and sends the memory read instruction to the first RDMA network interface card.

In this embodiment of this application, the direct access port stops the timer if receiving the to-be-read data before the timer expires; or the direct access port reports timeout response information to the processor core if not receiving the to-be-read data when the timer expires.

In a possible implementation, that the interconnection bus determines, from at least one RDMA network interface card based on a first mapping relationship, the first RDMA network interface card corresponding to the address of the to-be-read data specifically includes: The interconnection bus determines a first address window to which the address of the to-be-read data belongs, and determines, from the at least one RDMA network interface card based on the first mapping relationship, the first RDMA network interface card corresponding to the first address window.

In a possible implementation, the processor system of the source end device further includes a memory, the memory is connected to the interconnection bus. The memory of the source end device and the memory of the destination end device are addressed uniformly; or the memory of the source end device and the memory of the destination end device are not addressed uniformly.

In a possible implementation, the data transmission method provided in this embodiment of this application further includes: When the memory of the source end device and the memory of the destination end device are not addressed uniformly, the first RDMA network interface card translates the address of the to-be-read data based on a second mapping relationship. The second mapping relationship is a mapping relationship between a first memory address and a second memory address, the address of the to-be-read data is the first memory address, the first memory address is a mapping address obtained after the memory of the destination end device is mapped to address space of the source end device, a translated address is the second memory address, and the second memory address is a local address of the memory of the destination end device.

In a possible implementation, that the first RDMA network interface card sends a read request including an encapsulated register address to a second RDMA network interface card of the destination end device specifically includes: The first RDMA network interface card is specifically configured to: send, based on the translated address, the read request including the encapsulated register address to the second RDMA network interface card of the destination end device.

In a possible implementation, a protocol for encapsulating or decapsulating the to-be-read data includes one of the following: an RDMA protocol, a TCP protocol, an IP protocol, or an InfiniB and protocol.

In a possible implementation, the data transmission method provided in this embodiment of this application further includes: After the first RDMA network interface card receives the to-be-read data sent by the second RDMA network interface card, the first RDMA network interface card maintains a data structure of a data encapsulation protocol on the first RDMA network interface card. After the second RDMA network interface card sends the to-be-read data to the first RDMA network interface card, the second RDMA network interface card maintains a data structure of a data encapsulation protocol on the second RDMA network interface card.

For related content and technical effects of the second aspect, the third aspect, and the fourth aspect, refer to descriptions of the content and the technical effects of the first aspect. Details are not described herein again.

DESCRIPTION OF EMBODIMENTS

Figure 1:
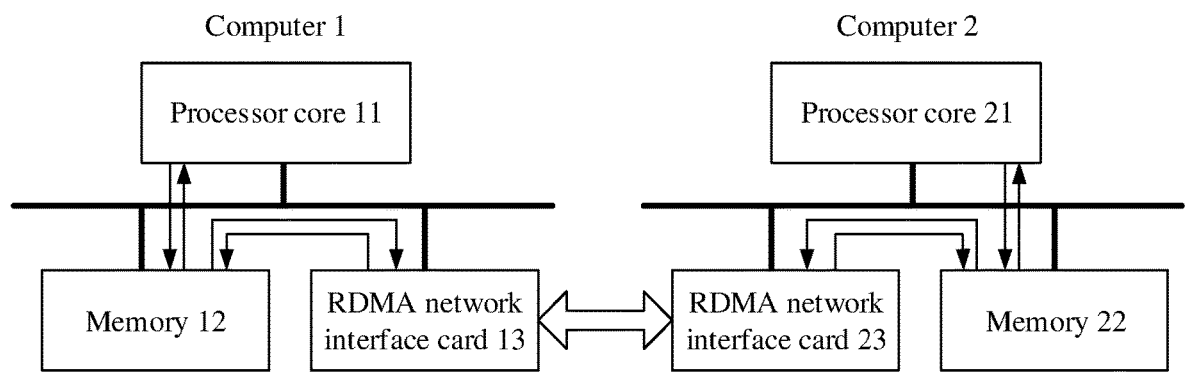
FIG. 1 is a schematic diagram 1 of an architecture of a memory access system according to an embodiment of this application.

The term "and/or" in this specification describes only an association relationship between associated objects and represents that three relationships may exist. For example, A and/or B may represent the following three cases: Only A exists, both A and B exist, and only B exists.

In the specification and claims of embodiments of this application, the terms "first", "second", and the like are intended to distinguish between different objects but not to describe a particular order of the objects. For example, a first RDMA network interface card, a second RDMA network interface card, and the like are intended to distinguish between different RDMA network interface cards but not to describe a particular order of the RDMA network interface cards.

In embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example" or "for example" or the like is intended to present a related concept in a specific manner.

In the description of embodiments of this application, unless otherwise specified, "a plurality of" means two or more than two. For example, a plurality of processing units refer to two or more processing units, and a plurality of systems refer to two or more systems.

In an existing remote memory access solution, in a data write process, a write task delivered by a processor core of a source end device carries a memory address (the memory address is used to write to-be-written data to a local memory) of the local memory of the source end device. The processor core encapsulates the to-be-written data based on a communication protocol (for example, for an RDMA protocol, refers to generating a WQE SGE), writes the to-be-written data to the local memory, and then notifies an RDMA network interface card to send the to-be-written data in the local memory to an RDMA card of a destination end device. Further, the RDMA network interface card of the destination end device writes the to-be-written data to a memory of the destination end device.

In a data read process, a read task delivered by the processor core of the source end device carries the memory address (the memory address is used to store data read from the memory of the destination end device) of the local memory of the source end device. The processor core encapsulates the memory address based on the communication protocol (for example, for the RDMA protocol, encapsulating refers to generating the WQE SGE), writes the memory address to the local memory, and then notifies the RDMA network interface card to execute the read task. Further, the RDMA network interface card of the source end device sends a read request to the RDMA network interface card of the destination end device. The RDMA network interface card of the destination end device sends read data to the RDMA network interface card of the source end device. Then, the RDMA network interface card of the source end device writes the read data to the local memory of the source end device.

Embodiments of this application provide a data transmission method, a processor system, and a memory access system. The memory access system includes a source end device and a destination end device, and can implement memory access between the source end device and the destination end device. Specifically, the source end device writes data to a memory of the destination end device, or the source end device reads data from a memory of the destination end device. In a data write process, a processor core of the source end device sends a memory write instruction to an RDMA network interface card of the source end device, and the memory write access instruction carries a memory address (a destination address of to-be-written data) of the destination end device. In this way, the to-be-written data does not need to be written to a local memory, but data exchange is implemented between the processor core and the RDMA network interface card. Then, the RDMA network interface card encapsulates the to-be-written data (that is, the network interface card performs an encapsulation action after receiving the memory write instruction instead of based on a notification of the processor core), and maintains a data structure of a communication protocol. Compared with the conventional technology, in this embodiment, the processor core of the source end device does not need to run complex application software to encapsulate the to-be-written data, and does not need to maintain the data structure of the communication protocol.

In a data read process, the processor core of the source end device sends a memory read instruction to the RDMA network interface card of the source end device. The memory read access instruction carries the memory address (an address of to-be-read data) of the destination end device and a register address of the processor core. Similar to the data write process, the processor core does not need to write the address of the to-be-read data and the register address to the local memory, but sends the memory read instruction to the RDMA network interface card of the source end device. Then, the RDMA network interface card of the source end device sends a read request to an RDMA network interface card of the destination end device. The RDMA network interface card of the destination end device reads the to-be-read data from the memory of the destination end device, encapsulates the to-be-read data, and returns the to-be-read data to the RDMA network interface card of the source end device, so that the RDMA network interface card of the source end device and the processor core implement data exchange. It can be learned that the RDMA network interface card of the destination end device encapsulates the to-be-read data, and maintains the data structure of the communication protocol. Compared with the conventional technology, in this embodiment, a processor core of the destination end device does not need to run complex application software to encapsulate the to-be-read data, and does not need to maintain the data structure of the communication protocol.

In conclusion, according to the technical solutions provided in embodiments of this application, a latency of remote memory access can be reduced. In addition, because the processor core does not need to encapsulate the to-be-written data, overheads of the processor core can be reduced, and computing power resources of the processor core can be saved.

The data transmission method, the processor system, and the memory access system that are provided in embodiments of this application are used in a remote memory access scenario, for example, include memory write and memory read, or another memory access manner (for example, atomic access). Details are separately described in the following embodiments.

Figure 2:
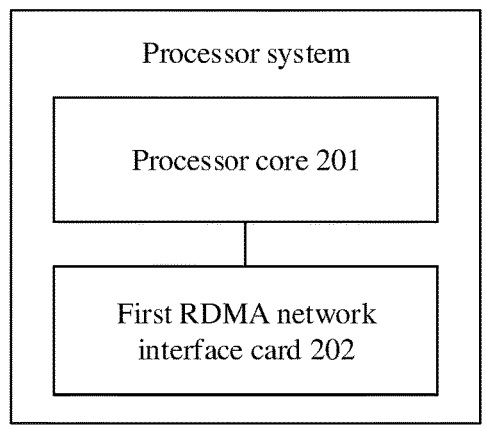
FIG. 2 is a schematic diagram 1 of a structure of a processor system according to an embodiment of this application.

First, for memory write, as shown in FIG. 2, an embodiment of this application provides a processor system. The processor system may be applied to a source end device. The processor system includes a processor core 201 and a first RDMA network interface card 202. The processor core 201 is configured to deliver a memory write instruction (a store instruction). The memory write instruction includes to-be-written data and a destination address of the to-be-written data, and the destination address of the to-be-written data is a memory address of a destination end device. The first RDMA network interface card 202 is configured to: encapsulate the to-be-written data based on the destination address of the to-be-written data and configuration information of the destination end device; and send encapsulated to-be-written data to a second RDMA network interface card of the destination end device, so that the second RDMA network interface card writes the to-be-written data to a memory of the destination end device.

The destination address of the to-be-written data is the memory address of the destination end device, which may be understood as writing the to-be-written data to a specified address (that is, the destination address) of the memory of the destination end device. Optionally, the destination address of the to-be-written data may be a physical address, or may be a virtual address. This is not limited in this embodiment of this application.

It should be noted that, in this embodiment of this application, the destination address of the to-be-written data carried in the memory write instruction may be a local address of the memory of the destination end device, or may be a mapping address obtained after the local address of the memory of the destination end device is mapped to address space of the source end device. Details are described in the following embodiments.

Optionally, the configuration information of the destination end device includes at least an address of the destination end device and/or an address of the second RDMA network interface card. The address of the destination end device and/or the address of the second RDMA network interface card are/is used to identify an RDMA network interface card. Before the processor core 201 delivers the memory write instruction, the first RDMA network interface card 202 is further configured to obtain the configuration information of the destination end device.

For example, the address of the second RDMA network interface card may be an internet protocol (IP) address of the second RDMA network interface card or a media access control (MAC) address of the second RDMA network interface card. This is not limited in this embodiment of this application.

In this embodiment of this application, before memory access is performed between the source end device and the destination end device, initialization configuration is separately performed on the source end device and the destination end device, including configuring information such as an address of each device and an address of an RDMA network interface card on the device, so that the source end device and the destination end device interact with each other, and send respective information such as the device address and the address of the RDMA network interface card to each other, to perform data encapsulation or decapsulation based on configuration information of the peer end during subsequent memory access.

In this embodiment of this application, a protocol for encapsulating the to-be-written data includes one of the following: an RDMA protocol, a transmission control protocol (TCP), an internet protocol (IP protocol), or an InfiniBand protocol. Specifically, a data encapsulation protocol is selected based on an actual situation, and the to-be-written data is encapsulated based on the address of the destination end device and/or the address of the RDMA network interface card on the destination end device.

It should be noted that specific content of information required for encapsulating the to-be-written data is related to an encapsulation protocol. For different encapsulation protocols, content of the information required for encapsulating the to-be-written data may be different.

It should be noted that, in this embodiment of this application, the memory write instruction delivered by the processor core of the source end device may be one instruction, or may be two instructions.

Figure 3:
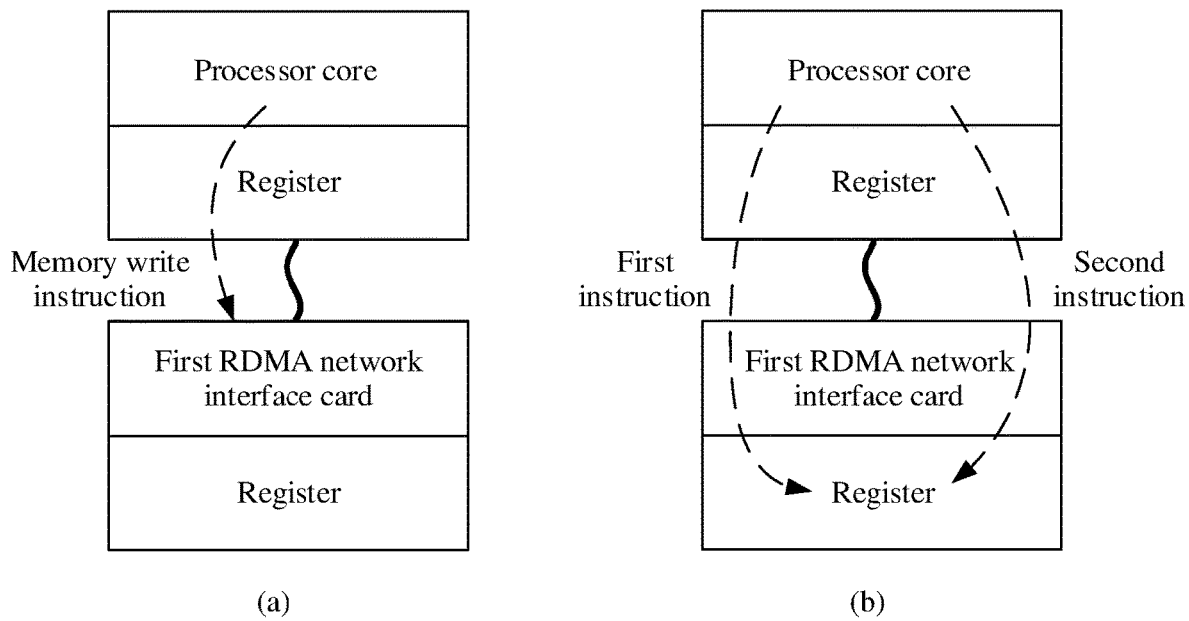
FIG. 3 is a schematic flowchart of delivering a memory write instruction according to an embodiment of this application.

In an implementation, as shown in (a) in FIG. 3, when the memory write instruction includes only one instruction, the to-be-written data is data in a register of the processor core. The processor core reads the to-be-written data from the register, carries the to-be-written data and the memory address (that is, the destination address) of the destination end device in the memory write instruction, and delivers the memory write instruction to notify another module to write the to-be-written data to memory space corresponding to the destination address in the memory of the destination end device.

Optionally, a data length supported by the register of the processor core may be 64 bits, and the register of the processor core also supports length extension. For example, the data length is extended to 128 bits or longer by using an extension instruction such as LDP. This is not limited in this embodiment of this application.

In another implementation, as shown in (b) in FIG. 3, the memory instruction includes a plurality of instructions, for example, the memory write instruction includes a first instruction and a second instruction. The processor core 201 is specifically configured to: deliver the first instruction, where the first instruction includes the to-be-written data and a first address; and deliver the second instruction, where the second instruction includes the destination address of the to-be-written data and a second address. The first address and the second address are addresses in a register in the first RDMA network interface card. It may be understood that the first address is an address that is in the register in the first RDMA network interface card and that is used to store the to-be-written data, and the second address is an address that is in the register in the first RDMA network interface card and that is used to store the destination address of the to-be-written data.

Correspondingly, the first RDMA network interface card 202 is specifically configured to: write the to-be-written data to the register in the first RDMA network interface card based on the first address in the first instruction, write the destination address of the to-be-written data to the register in the first RDMA network interface card based on the second address in the second instruction, encapsulate the to-be-written data based on the destination address of the to-be-written data in the register in the first RDMA network interface card, and send the encapsulated to-be-written data to the second RDMA network interface card of the destination end device, so that the second RDMA network interface card writes the to-be-written data to the memory of the destination end device.

It may be understood that the processor core writes the to-be-written data to the register of the first RDMA network interface card by using the first instruction, and writes the destination address (that is, the memory address of the destination end device) of the to-be-written data to the register of the first RDMA network interface card by using the second instruction. When the first RDMA network interface card detects that the to-be-written data and the destination address of the to-be-written data are stored in a specified address in the register of the first RDMA network interface card (that is, storage space corresponding to the first address stores the to-be-written data, and storage space corresponding to the second address stores the destination address of the to-be-written data), the first RDMA network interface card writes the to-be-written data to the memory space corresponding to the destination address in the memory of the destination end device.

Figure 4:
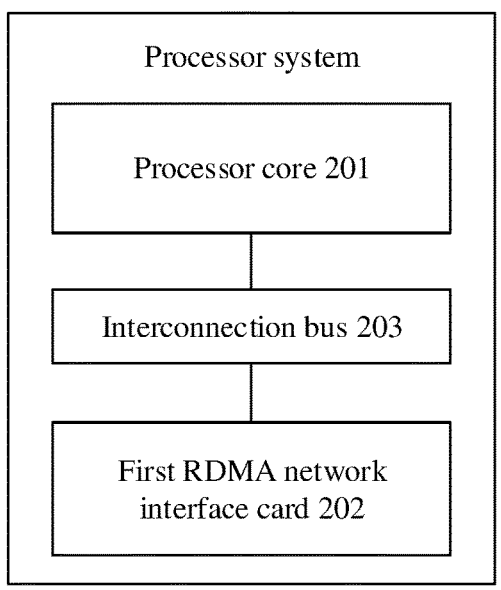
FIG. 4 is a schematic diagram 2 of a structure of a processor system according to an embodiment of this application.

Optionally, as shown in FIG. 4, the processor system (of the source end device) provided in this embodiment of this application further includes an interconnection bus 203. The interconnection bus 203 is connected to the processor core 201 and at least one RDMA network interface card. The at least one RDMA network interface card includes the first RDMA network interface card 202. The interconnection bus 203 is configured to: receive the memory write instruction delivered by the processor core, determine, from the at least one RDMA network interface card based on a first mapping relationship, the first RDMA network interface card 202 corresponding to the destination address of the to-be-written data, and send the to-be-written data to the first RDMA network interface card 202. The first mapping relationship is a mapping relationship between an address window and an address of an RDMA network interface card.

The interconnection bus 203 is specifically configured to: determine a first address window to which the destination address of the to-be-written data belongs, and determine, from the at least one RDMA network interface card based on the first mapping relationship, the first RDMA network interface card corresponding to the first address window.

Optionally, in this embodiment of this application, the interconnection bus is configured to connect the processor core and another component. The interconnection bus includes but is not limited to a CHI, an AXI, a PCIE, and a CXL, and is specifically selected based on an actual use requirement. This is not limited in this embodiment of this application.

It may be understood that the memory write instruction delivered by the source end device is sent to the first RDMA network interface card of the source end device through the interconnection bus, and then is sent to the second RDMA network interface card of the destination end device.

Figure 5:
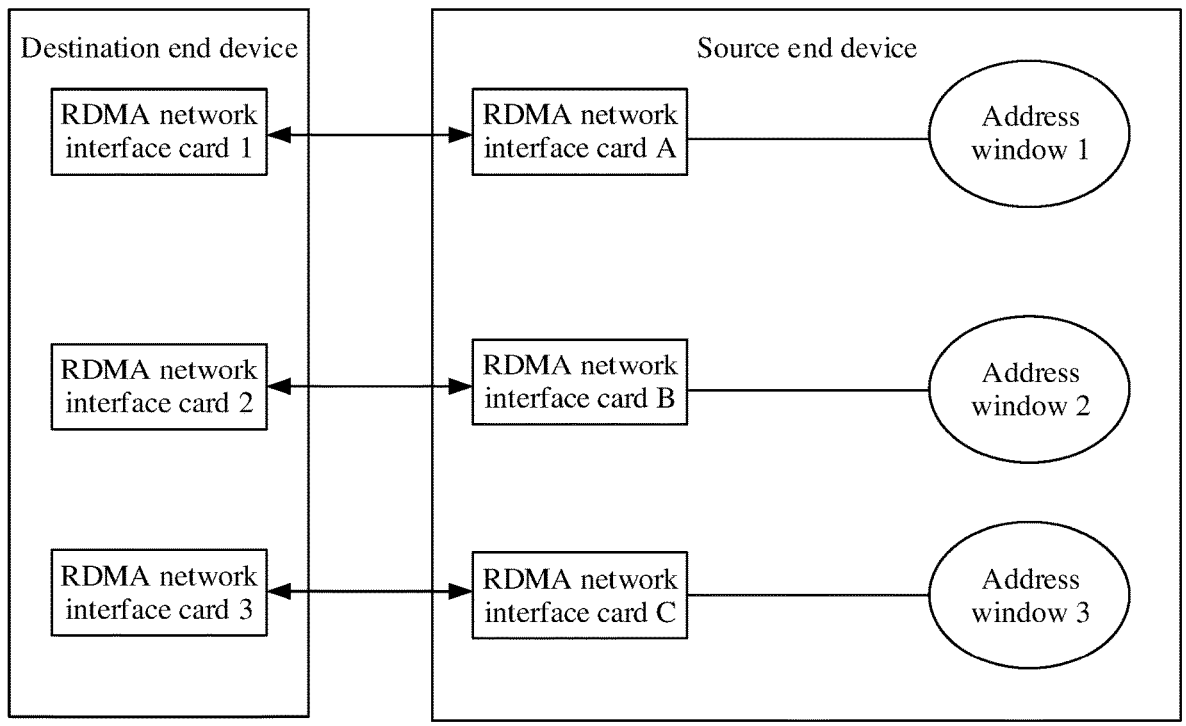
FIG. 5 is a schematic diagram of a connection relationship between an RDMA network interface card of a source end device and an RDMA network interface card of a destination end device according to an embodiment of this application.

In this embodiment of this application, the interconnection bus of the source end device is configured to perform address mapping on the memory write instruction delivered by the processor core of the source end device, so as to forward data. It should be understood that the source end device may include at least one RDMA network interface card, and the at least one RDMA network interface card may be separately connected to RDMA network interface cards of one or more other devices (including the destination end device), to implement remote memory access. FIG. 5 is a schematic diagram of a connection relationship between at least one RDMA network interface card (including an RDMA network interface card A, an RDMA network interface card B, and an RDMA network interface card C) of a source end device and RDMA network interface cards (including an RDMA network interface card 1, an RDMA network interface card 2, and an RDMA network interface card 3) of a destination end device. Because the source end device includes a plurality of RDMA network interface cards, when an interconnection bus of the source end device receives a memory write instruction, the interconnection bus needs to determine an RDMA network interface card of the source end device to which the memory write instruction is sent. Specifically, the interconnection bus determines, based on a first mapping relationship preconfigured on the interconnection bus, an address window (one address window may include a plurality of memory addresses) to which a destination address included in the memory write instruction belongs. Further, the memory write instruction is sent to an RDMA network interface card corresponding to the address window to which the destination address belongs. With reference to FIG. 5, Table 1 is an example of the first mapping relationship of the source end device.

TABLE 1

| RDMA network interface card | Address window | |
|---|---|---|
| RDMA network interface card A | Address window 1 | Memory address 1 . . . Memory address n |
| RDMA network interface card B | Address window 2 | Memory address n + 1 . . . Memory address 2n |
| RDMA network interface card C | Address window 3 | Memory address 2n + 1 . . . Memory address 3n |

With reference to Table 1, it is assumed that a destination address included in the memory write instruction received by the interconnection bus is a memory address 8. The interconnection bus determines that the memory address 8 is a memory address in the address window 1, and an RDMA network interface card corresponding to the address window 1 is the RDMA network interface card A. Therefore, the interconnection bus sends the received memory write instruction to the RDMA network interface card A.

Figure 6:
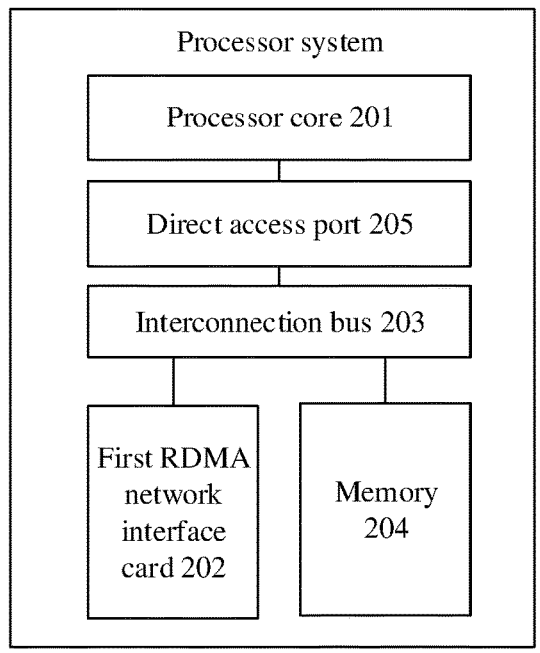
FIG. 6 is a schematic diagram 3 of a structure of a processor system according to an embodiment of this application.

Optionally, as shown in FIG. 6, the processor system (of the source end device) provided in this embodiment of this application further includes a memory 204. The memory 204 is connected to the interconnection bus 203.

Optionally, the memory (that is, the memory 204) of the source end device and a memory of the destination end device are addressed uniformly; or the memory of the source end device and a memory of the destination end device are not addressed uniformly. It should be understood that, in this embodiment of this application, a memory address of the source end device is a local address of the memory of the source end device, and a memory address of the destination end device is also a local address of the memory of the destination end device.

For example, when the memory of the source end device and the memory of the destination end device are addressed uniformly, addresses of the memory of the source end device are 0x00000000 to 0x80000000, and addresses of the memory of the destination end device are 0x90000000 to 0x100000000. For another example, when the memory of the source end device and the memory of the destination end device are not addressed uniformly, the addresses of the memory of the source end device are 0x00000000 to 0x80000000, and the addresses of the memory of the destination end device are 0x00000000 to 0x80000000. It can be learned that when the memory of the source end device and the memory of the destination end device are not addressed uniformly, duplicate addressing occurs between the memory address of the source end device and the memory address of the destination end device.

When the memory of the source end device and the memory of the destination end device are not addressed uniformly, the memory address of the source end device may conflict with the memory address of the destination end device. Therefore, when a processor core of the source end device delivers the memory write instruction, after the first RDMA network interface card of the source end device receives the write instruction, the first RDMA network interface card cannot identify whether a memory address in the write instruction is the memory address of the source end device or the memory address of the destination end device. As a result, memory access may fail.

In this embodiment of this application, when the memory of the source end device and the memory of the destination end device are not addressed uniformly, the first RDMA network interface card is further configured to translate a destination address of to-be-written data based on a second mapping relationship. The second mapping relationship is a mapping relationship between a first memory address and a second memory address. The destination address of the to-be-written data is the first memory address, the first memory address is a mapping address obtained after the memory of the destination end device is mapped to address space of the source end device, a translated destination address is the second memory address, and the second memory address is a local address of the memory of the destination end device.

The first RDMA network interface card is specifically configured to encapsulate the to-be-written data based on the translated destination address and configuration information of the destination end device.

For example, the address space of the source end device is 0x00000000 to 0xffffffff, where 0x00000000 to 0x80000000 are local addresses of the memory of the source end device, 0x90000000 to 0x100000000 are mapping addresses obtained after the memory of the destination end device is mapped to the address space of the source end device, and local addresses of the memory of the destination end device are 0x00000000 to 0x80000000. Table 2 is an example of the second mapping relationship.

TABLE 2

| First memory address | Second memory address |
|---|---|
| 0x90000000 | 0x00000000 |
| . . . | . . . |
| 0x100000000 | 0x80000000 |

With reference to Table 2, when the source end device writes data to the destination end device, the destination address in the memory write instruction delivered by the processor core of the source end device is 0x90000001. After receiving the memory write instruction, the first RDMA network interface card determines that the destination address is within an address range from 0x90000000 to 0x100000000. It can be learned that the memory write instruction is used to indicate to write the to-be-written data to the memory of the destination end device. Therefore, the first RDMA network interface card translates, based on the second mapping relationship shown in Table 2, 0x90000001 to 0x00000001 (the local address of the memory of the destination end device). In this case, the first RDMA network interface card sends the to-be-written data to the second RDMA network interface card of the destination end device, to write the to-be-written data to memory space whose memory address is 0x00000001 and that is of the destination end device.

In conclusion, when the memory of the source end device and the memory of the destination end device are not addressed uniformly, the first RDMA network interface card performs address translation on a destination address of memory access by using address mapping, to resolve an address conflict problem, so that memory access can be successfully completed.

Optionally, as shown in FIG. 6, the processor system (of the source end device) provided in this embodiment of this application further includes a direct access port 205. The processor core 201 is connected to the interconnection bus 203 through the direct access port 205. The direct access port 205 is configured to: receive the memory write instruction from the processor core 201, add a timestamp (that is, a time tag) to the memory write instruction, start a timer in the direct access port 205, and further send the memory write instruction to the interconnection bus 203.

In this embodiment of this application, a time register is disposed in the direct access port 205, and the time register is configured to perform order preserving for the memory write instruction. Specifically, when receiving the memory write instruction, the direct access port 205 adds a timestamp to the memory write instruction. In this way, when receiving a plurality of instructions, the destination end device (which is specifically a memory controller of the destination end device) may sequentially process the plurality of instructions based on timestamp information of the instructions, that is, based on a time sequence of the instructions, to avoid congestion. Optionally, a length of the time register is 64 bits.

Optionally, the timer is further disposed in the direct access port 205 (when the direct access port 205 receives the memory write instruction, the direct access port 205 starts the timer), and the direct access port 205 is specifically configured to stop the timer when receiving a response message of the second RDMA network interface card before the timer expires. In this embodiment of this application, after the second RDMA network interface card writes the to-be-written data to the memory of the destination end device, the second RDMA network interface card sends the response message to the source end device (by sequentially using the first RDMA network interface card 202, the interconnection bus 203, the direct access port 205, and the processor core 201). If the direct access port 205 receives the response message before the timer expires, it indicates that the memory write instruction runs normally, that is, the to-be-written data is successfully written to the memory of the destination end device.

Alternatively, the direct access port 205 is specifically configured to: report timeout response information to the processor core if not receiving a response message of the second RDMA network interface card when the timer expires. In this embodiment of this application, when an exception such as timeout or jitter occurs in the memory write instruction, and the direct access port does not receive the response message when the timer expires, the direct access port reports the timeout response message to the processor core. In this case, the processor core responds to the timeout case, to avoid suspension of the processor core.

In conclusion, the direct access port on which the timer is disposed has an instruction timeout return function, and in a memory access process, whether data transmission succeeds can be ensured. This avoids system suspension.

Optionally, in this embodiment of this application, the first RDMA network interface card is further configured to: after receiving the response message of the second RDMA network interface card, maintain a data structure of a data encapsulation protocol on the first RDMA network interface card (which may be understood as updating related configuration information). The following describes the data structure in detail with reference to a specific protocol.

It should be noted that, in this embodiment of this application, the three components: the first RDMA network interface card 202, the interconnection bus 203, and the direct access port 205 are merely logically divided, and physical forms of the three components are not limited. The three components may be integrated into different chips and run on different devices. Alternatively, the three components may be integrated into a unified chip and run on a unified device.

An embodiment of this application provides a processor system. When a processor core of the processor system delivers a memory write instruction, an RDMA network interface card in the processor system may encapsulate to-be-written data, and send encapsulated data to an RDMA network interface card of a destination end device, so that the RDMA network interface card of the destination end device writes the to-be-written data to a memory of the destination end device. A processor core of a source end device sends the memory write instruction to an RDMA network interface card of the source end device, and the memory write access instruction carries a memory address (a destination address of the to-be-written data) of the destination end device. In this way, the to-be-written data does not need to be written to a local memory, but data exchange is implemented between the processor core and the RDMA network interface card. Then, the RDMA network interface card encapsulates the to-be-written data (that is, the network interface card performs an encapsulation action after receiving the memory write instruction instead of based on a notification of the processor core), and maintains a data structure of a communication protocol. Compared with the conventional technology, in this embodiment, the processor core of the source end device does not need to run complex application software to encapsulate the to-be-written data, and does not need to maintain the data structure of the communication protocol. Therefore, a latency of remote memory access can be reduced.

In addition, because the processor core does not need to encapsulate the to-be-written data, overheads of the processor core can be reduced, and computing power resources of the processor core can be saved.

It can be learned with reference to the descriptions of the foregoing embodiments that, when the processor system in this embodiment of this application is used to write data, a data encapsulation and decapsulation protocol may be one of a plurality of protocols. The following uses an RDMA protocol as an example to describe in detail a memory access (including data write and data read) process of the source end device and the destination end device.

Figure 7:
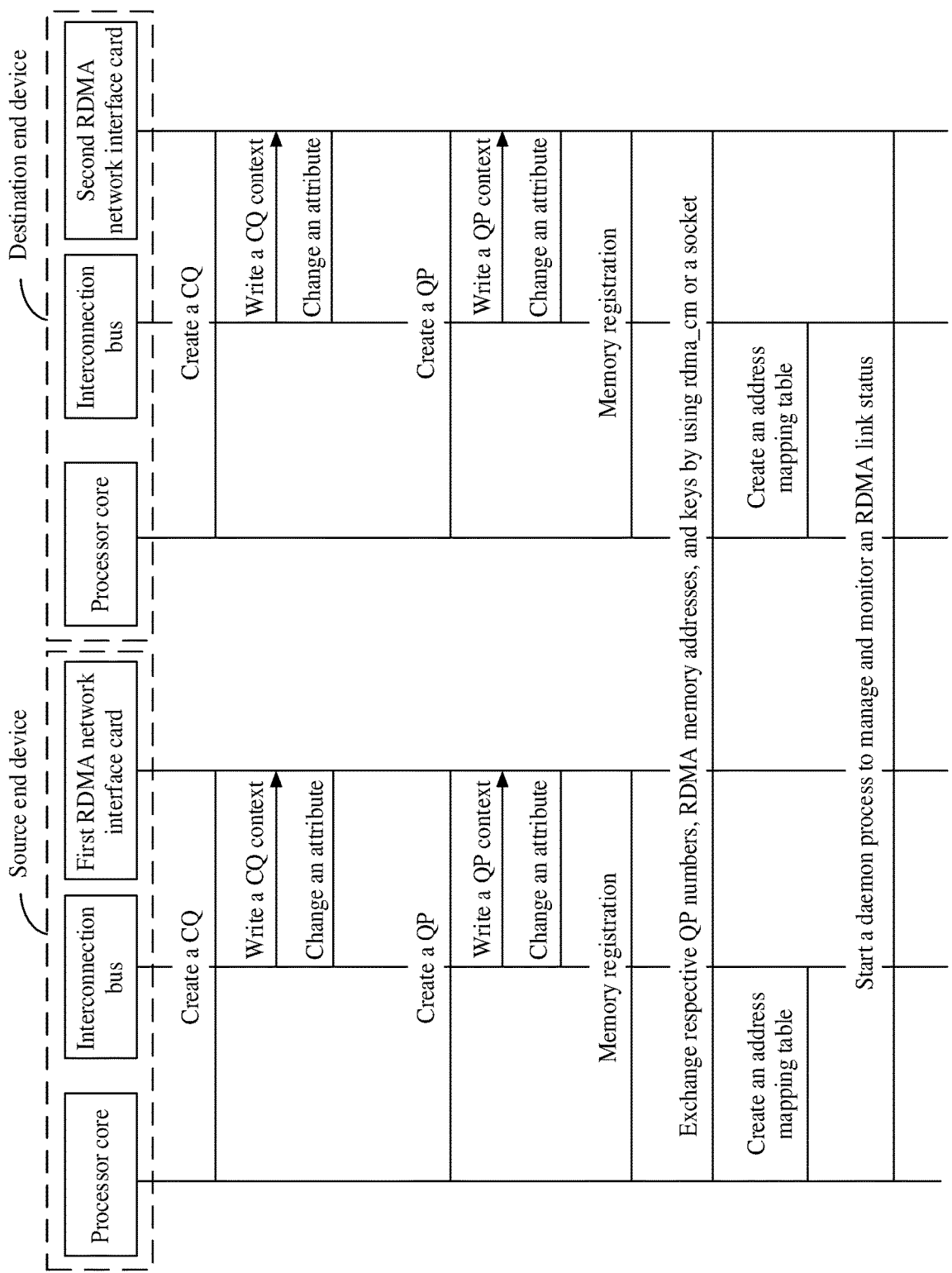
FIG. 7 is a configuration flowchart of a source end device and a destination end device according to an embodiment of this application.

First, a process of configuring the source end device and the destination end device is briefly described with reference to a configuration flowchart in FIG. 7.

Step 1: A source end device and a destination end device separately perform initialization, and configure configuration space (bar space) of respective RDMA network interface cards of the source end device and the destination end device.

Step 2: The source end device and the destination end device separately create a queue pair (QP).

Specifically, a processor core of the source end device interacts with the RDMA network interface card (a first RDMA network interface card) of the source end device through an interconnection bus, to complete a QP creation procedure and generate a QP number of the source end device. Similarly, a processor core of the destination end device interacts with the RDMA network interface card (a second RDMA network interface card) of the destination end device through an interconnection bus, to complete a QP creation procedure and generate a QP number of the destination end device. It may be understood that before a QP is created, a CQ (complete queue) is first created, including writing a CQ context and changing a CQ attribute. Creating a QP includes writing a QP context and changing a QP attribute.

For descriptions of a detailed process of creating the QP, refer to content of an existing RDMA technology. Details are not described again in this embodiment of this application.

Step 3: The source end device and the destination end device separately perform memory registration.

In this embodiment of this application, the source end device and the destination end device separately perform memory registration, to set specific memory space that is in memories of the source end device and the destination end device and that can be accessed by the RDMA network interface card. The memory that can be accessed by the RDMA network interface card may also be referred to as an RDMA memory.

Step 4: The source end device and the destination end device exchange respective QP numbers and RDMA memory addresses.

In this embodiment of this application, the source end device and the destination end device first perform link establishment, and create a queue pair context (QPC). The QPC includes all configuration information of the QP, and the QPC is used to record information required for encapsulating (assembling) a packet by an RDMA network interface card, such as a fetch address. Optionally, link establishment may be performed in a CM (communication management) or socket (network socket) manner.

After completing link establishment, the source end device and the destination end device may exchange, by using rdma_cm (remote direct memory access communication management) or a socket (network socket), the QP number, the RDMA memory address, authorization information (key) corresponding to an IP address of the device, and the like. Specifically, the RDMA network interface card of the source end device sends, to the RDMA network interface card of the destination end device, the QP number of the source end device, the RDMA memory address, the authorization information corresponding to the IP address of the source end device, and the like. The RDMA network interface card of the destination end device sends, to the RDMA network interface card of the source end device, the QP number of the destination end device, the RDMA memory address, the authorization information (key) corresponding to the IP address of the destination end device, and the like.

Step 5: The source end device and the destination end device configure respective address mapping relationships.

Specifically, the source end device configures the foregoing first mapping relationship. When a memory of the source end device and a memory of the destination end device are not addressed uniformly, the foregoing second mapping relationship further needs to be configured. Similarly, the destination end device also configures a corresponding mapping relationship.

Optionally, an address window in the first mapping relationship may support a plurality of configurations. For example, an access attribute of the address window is configured to have a read permission and/or a write permission, support sharing, or the like.

Step 7: Start a daemon process to manage and monitor an RDMA link status.

Figure 8:
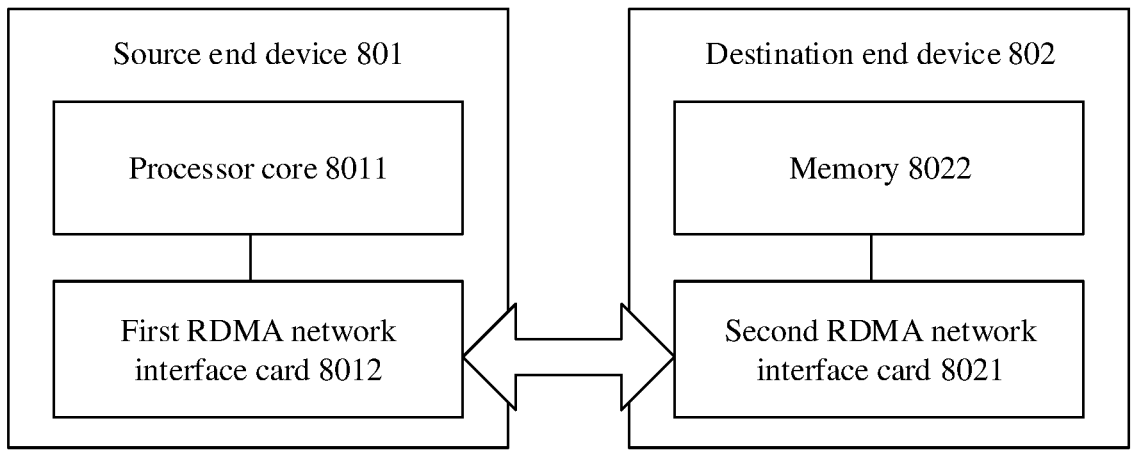
FIG. 8 is a schematic diagram 2 of an architecture of a memory access system according to an embodiment of this application.

Based on the foregoing configuration procedures of the source end device and the destination end device, as shown in FIG. 8, an embodiment of this application provides a memory access system, including a source end device 801 and a destination end device 802. A processor system of the source end device 801 includes a processor core 8011 and a first RDMA network interface card 8012, and a processor system of the destination end device 802 includes a second RDMA network interface card 8021 and a memory 8022. The processor core 8011 of the source end device 801 is configured to deliver a memory write instruction (that is, a store instruction). The memory write instruction includes to-be-written data and a destination address of the to-be-written data. The destination address is a memory address of the destination end device 802. The first RDMA network interface card 8012 is configured to: encapsulate the to-be-written data based on the destination address of the to-be-written data and configuration information of the destination end device, and send encapsulated to-be-written data to the second RDMA network interface card 8021 of the destination end device 802. The second RDMA network interface card 8021 is configured to: receive the encapsulated to-be-written data, decapsulate the encapsulated to-be-written data, and write decapsulated to-be-written data to the memory 8022 of the destination end device 802.

Optionally, in this embodiment of this application, the memory write instruction delivered by the processor core 8011 of the source end device 801 may include one instruction, or the memory write instruction may include two instructions.

When the memory write instruction includes two instructions, that is, includes a first instruction and a second instruction, the processor core 8011 is specifically configured to: deliver the first instruction, where the first instruction includes the to-be-written data and a first address; and deliver the second instruction, where the second instruction includes the destination address of the to-be-written data and a second address. The first address and the second address are addresses in a register in the first RDMA network interface card. It may be understood that the first address is an address that is in the register in the first RDMA network interface card and that is used to store the to-be-written data, and the second address is an address that is in the register in the first RDMA network interface card and that is used to store the destination address of the to-be-written data. Based on this, the first RDMA network interface card 8012 is specifically configured to: write the to-be-written data to the register in the first RDMA network interface card based on the first address in the first instruction, write the destination address of the to-be-written data to the register in the first RDMA network interface card based on the second address in the second instruction, encapsulate the to-be-written data based on the destination address of the to-be-written data in the register, and send the encapsulated to-be-written data to the second RDMA network interface card 8021 of the destination end device 802, so that the second RDMA network interface card 8021 writes the to-be-written data to the memory 8022 of the destination end device 802.

Figure 9:
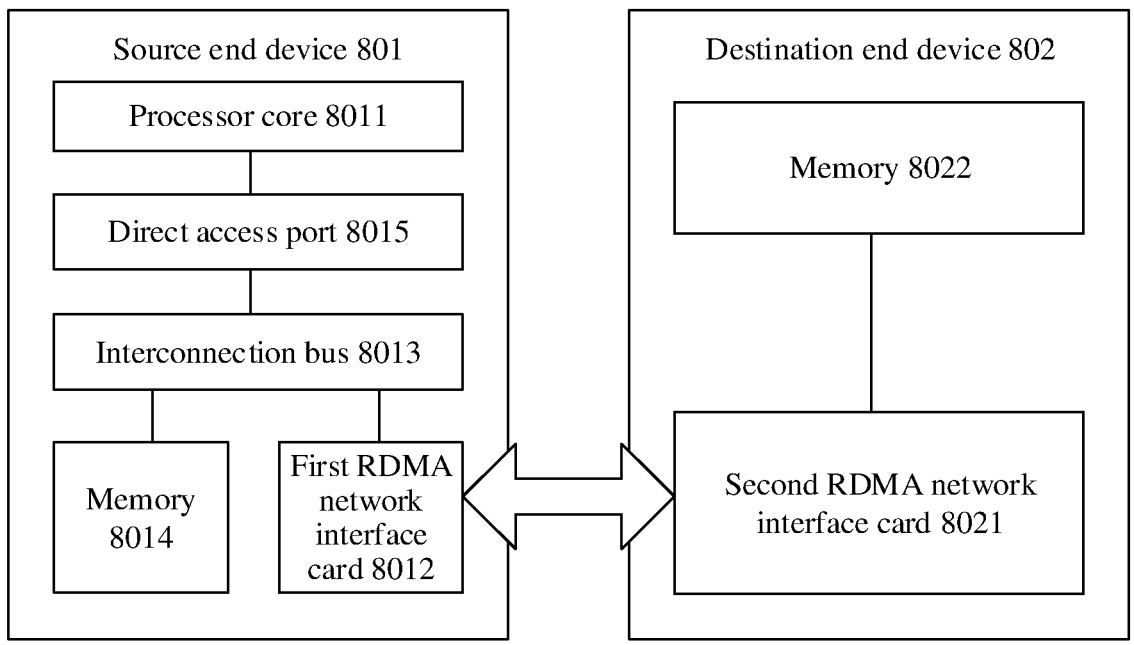
FIG. 9 is a schematic diagram 3 of an architecture of a memory access system according to an embodiment of this application.

Optionally, as shown in FIG. 9, the processor system of the source end device further includes an interconnection bus 8013. The interconnection bus 8013 is connected to the processor core 8011 and at least one RDMA network interface card. The at least one RDMA network interface card includes the first RDMA network interface card 8012. The interconnection bus 8013 is configured to: receive the memory write instruction delivered by the processor core 8011, determine, from the at least one RDMA network interface card based on a first mapping relationship, the first RDMA network interface card 8012 corresponding to the destination address of the to-be-written data, and send the to-be-written data to the first RDMA network interface card 8012. The first mapping relationship is a mapping relationship between an address window and an address of an RDMA network interface card.

The interconnection bus 8013 is specifically configured to: determine a first address window to which the destination address of the to-be-written data belongs, and determine, from the at least one RDMA network interface card based on the first mapping relationship, the first RDMA network interface card corresponding to the first address window.

For detailed descriptions of the first mapping relationship, refer to related content in the foregoing embodiments. Details are not described herein again.

Optionally, with reference to FIG. 9, the processor system of the source end device 801 further includes a memory 8014. The memory 8014 of the source end device 801 is connected to the interconnection bus 8013. The memory 8014 of the source end device 801 and the memory 8022 of the destination end device 802 are addressed uniformly; or the memory 8014 of the source end device 801 and the memory 8022 of the destination end device 802 are not addressed uniformly.

In this embodiment of this application, when the memory 8014 of the source end device 801 and the memory 8022 of the destination end device 802 are not addressed uniformly, the first RDMA network interface card 8012 is further configured to translate the destination address of the to-be-written data based on a second mapping relationship. The second mapping relationship is a mapping relationship between a first memory address and a second memory address. The destination address of the to-be-written data is the first memory address, the first memory address is a mapping address obtained after the memory of the destination end device is mapped to address space of the source end device, a translated destination address is the second memory address, and the second memory address is a local address of the memory of the destination end device.

The first RDMA network interface card 8012 is specifically configured to encapsulate the to-be-written data based on the translated destination address and the configuration information of the destination end device 802.

In this embodiment of this application, the first RDMA network interface card obtains the configuration information of the destination end device in the configuration procedure. The configuration information includes an IP address of the destination end device. For an RDMA protocol, the configuration information further includes information such as a QP number of the destination end device and authorization information (key) corresponding to the IP address of the destination end device. The authorization information indicates a segment of memory space in the memory of the destination end device. Further, the first RDMA network interface card encapsulates the to-be-written data based on information such as the destination address of the to-be-written data, the IP address of the destination end device, a QP context corresponding to the QP number of the destination end device, the authorization information, and a length of the to-be-written data, to assemble the to-be-written data into a WQE packet, and sends the WQE packet to the second RDMA network interface card. After receiving the WQE packet, the second RDMA network interface card decapsulates the WQE packet to obtain the to-be-written data, and writes the to-be-written data to memory space corresponding to the authorization information.

Optionally, with reference to FIG. 9, the processor system of the source end device 801 further includes a direct access port 8015. The processor core 8011 of the source end device 801 is connected to the interconnection bus 8013 through the direct access port 8015. The direct access port 8015 is configured to: receive the memory write instruction from the processor core 8011, add a timestamp to the memory write instruction, start a timer in the direct access port, and further send the memory write instruction to the interconnection bus 8013.

The direct access port 8015 is specifically configured to: stop the timer if receiving a response message of the second RDMA network interface card before the timer expires; or report timeout response information to the processor core if not receiving a response message of the second RDMA network interface card when the timer expires.

In this embodiment of this application, after the second RDMA network interface card writes the to-be-written data to the memory of the destination end device, the second RDMA network interface card sends the response message to the first RDMA network interface card, to notify the source end device (through the interconnection bus and the direct access port to the processor core) that a write procedure of the to-be-written data is completed. Then, the processor core exits the memory write instruction. Specifically, the first RDMA network interface card reports the timeout response information to the direct access port by using an interrupt, so that the direct access port reports the timeout response information to the processor core.

Optionally, the first RDMA network interface card is further configured to: after receiving the response message of the second RDMA network interface card, maintain a data structure of the RDMA protocol in the first RDMA network interface card. Maintaining the data structure of the RDMA protocol by the first RDMA network interface card specifically includes but is not limited to updating a CQE, a CQC, and a CE. Specifically, the first RDMA network interface card generates the complete queue event (CQE) and the CE (where the CE is an element in the CQE) based on a queue pair context QPC and the complete queue context (CQC). In this embodiment of this application, the RDMA network interface card maintains the data structure of the RDMA protocol, and the processor core does not need to maintain the data structure of the RDMA protocol. In this way, overheads of the processor core can be reduced.

Figure 10:
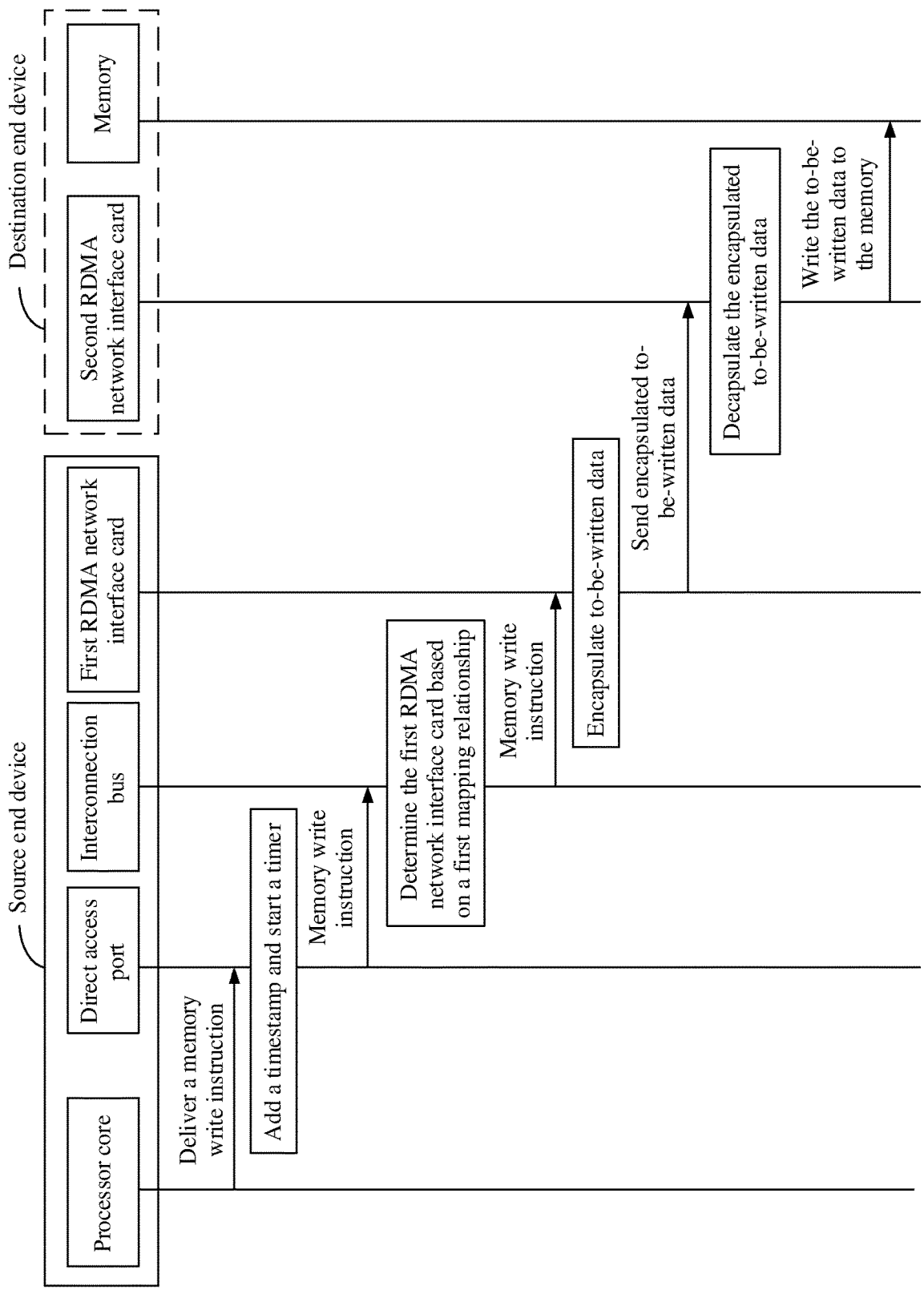
FIG. 10 is a flowchart 1 of a data transmission method according to an embodiment of this application.

For detailed content descriptions of the interconnection bus and the direct access port of the source end device, refer to related descriptions in the foregoing embodiments. Details are not described herein again. The foregoing memory access process may be understood with reference to FIG. 10. Correspondingly, an embodiment of this application provides a data transmission method, including the following steps:

Step 1001: A processor core of a source end device delivers a memory write instruction.

Step 1002: A direct access port of the source end device receives the memory write instruction, adds a timestamp to the memory write instruction, starts a timer in the direct access port, and sends the memory write instruction to an interconnection bus of the source end device.

Step 1003: The interconnection bus of the source end device receives the memory write instruction from the direct access port, determines a first RDMA network interface card from at least one RDMA network interface card based on a first mapping relationship, and sends the memory write instruction to the first RDMA network interface card.

Step 1004: The first RDMA network interface card of the source end device receives the memory write instruction, encapsulates to-be-written data based on a destination address of the to-be-written data and configuration information of a destination end device, and sends encapsulated to-be-written data to a second RDMA network interface card of the destination end device.

In this embodiment of this application, before the processor core of the source end device delivers the memory write instruction, the first RDMA network interface card obtains the configuration information of the destination end device. The configuration information of the destination end device includes at least an address of the destination end device and/or an address of the second RDMA network interface card.

Optionally, when a memory of the source end device and a memory of the destination end device are not addressed uniformly, the first RDMA network interface card translates the destination address of the to-be-written data based on a second mapping relationship. In this way, the first RDMA network interface card encapsulates the to-be-written data based on the translated destination address and the configuration information of the destination end device.

Step 1005: The second RDMA network interface card of the destination end device receives the encapsulated to-be-written data, decapsulates the encapsulated to-be-written data, and writes decapsulated to-be-written data to memory space corresponding to the destination address in the memory of the destination end device.

Step 1006: The second RDMA network interface card of the destination end device sends a response message to the first RDMA network interface card of the source end device.

In this embodiment of this application, after the first RDMA network interface card receives the response message sent by the second RDMA network interface card, the first RDMA network interface card maintains a data structure of a data encapsulation protocol on the first RDMA network interface card.

For descriptions of the steps of the data transmission method, refer to the descriptions of the foregoing embodiments. Details are not described herein again.

Figure 11:
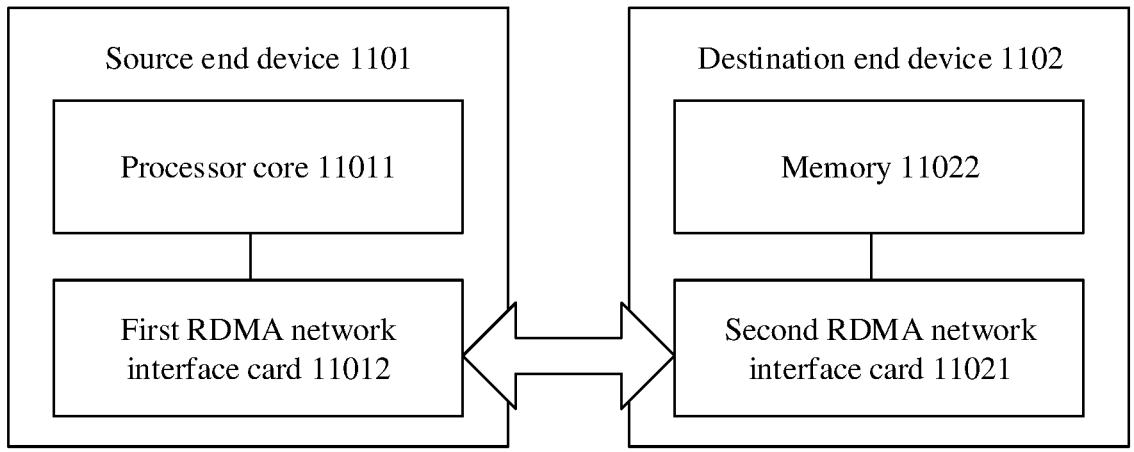
FIG. 11 is a schematic diagram 4 of an architecture of a memory access system according to an embodiment of this application.

Based on the foregoing configuration procedures of the source end device and the destination end device, an embodiment of this application provides a memory access system. As shown in FIG. 11, the memory access system includes a source end device 1101 and a destination end device 1102. A processor system of the source end device 1101 includes a processor core 11011 and a first RDMA network interface card 11012, and a processor system of the destination end device 1102 includes a second RDMA network interface card 11021 and a memory 11022. The processor core 11011 of the source end device 1101 is configured to deliver a memory read instruction (that is, a load instruction). The memory read instruction includes an address of to-be-read data and a register address. The address of the to-be-read data is a memory address of the destination end device, and the register address is an address in a register of the processor core. The first RDMA network interface card 11012 is configured to: encapsulate the register address based on the address of the to-be-read data and configuration information of the destination end device, and send a read request including an encapsulated register address to the second RDMA network interface card 11021 of the destination end device 1102. The second RDMA network interface card 11021 is configured to: receive the read request from the first RDMA network interface card, decapsulate the encapsulated register address, read the to-be-read data from the memory of the destination end device based on the address of the to-be-read data, encapsulate the to-be-read data based on the register address and configuration information of the source end device, and send encapsulated to-be-read data to the first RDMA network interface card. The first RDMA network interface card 11012 is further configured to: receive the encapsulated to-be-read data from the second RDMA network interface card 11021, decapsulate the encapsulated to-be-read data, and send decapsulated to-be-read data to the register of the processor core 11011.

The configuration information of the destination end device includes at least an IP address of the destination end device and/or an address of the second RDMA network interface card, and the configuration information of the source end device includes at least an IP address of the source end device and/or an address of the first RDMA network interface card.

Similarly, the first RDMA network interface card obtains the configuration information of the destination end device in the configuration procedure. The configuration information includes the IP address of the destination end device. For an RDMA protocol, the configuration information further includes information such as a QP number of the destination end device and authorization information (key) corresponding to the IP address of the destination end device. The authorization information indicates a segment of memory space in the memory of the destination end device. Further, the first RDMA network interface card encapsulates the register address of the processor core of the source end device based on information such as a destination address of the memory read instruction, the IP address of the destination end device, a QP context corresponding to the QP number of the destination end device, the authorization information, and a length of the to-be-read data, to assemble the register address into a WQE packet, and sends the WQE packet to the second RDMA network interface card.

After receiving the WQE packet, the second RDMA network interface card decapsulates the WQE packet to obtain the address of the to-be-read data and the register address of the processor core of the source end device, and reads data in the memory space corresponding to the destination address in the memory of the destination end device. In addition, the second RDMA network interface card encapsulates the to-be-read data based on the register address and the configuration information of the source end device (including the IP address of the source end device, the QP number, and the authorization information corresponding to the IP address of the source end device) obtained by the second RDMA network interface card.

Figure 12:
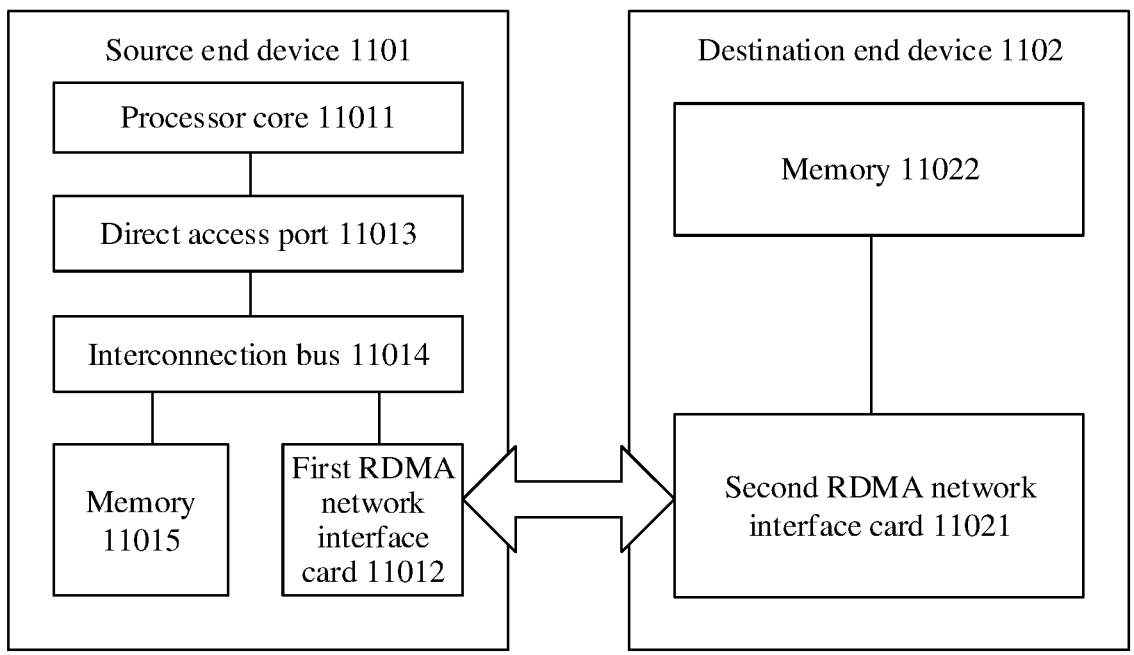
FIG. 12 is a schematic diagram 5 of an architecture of a memory access system according to an embodiment of this application.

Optionally, as shown in FIG. 12, the processor system of the source end device further includes a direct access port 11013 and an interconnection bus 11014. The processor core 11011 is connected to the interconnection bus 11014 through the direct access port 11013, the interconnection bus 11014 is further connected to at least one RDMA network interface card, and the at least one RDMA network interface card includes the first RDMA network interface card 11012. The direct access port 11013 is configured to: receive the memory read instruction from the processor core 11011, add a timestamp to the memory read instruction, and start a timer in the direct access port 11013. The interconnection bus 11014 is configured to: receive the memory read instruction from the direct access port 11013, determine, from the at least one RDMA network interface card based on a first mapping relationship, the first RDMA network interface card 11012 corresponding to the address of the to-be-read data, and send the memory read instruction to the first RDMA network interface card 11012. The first mapping relationship is a mapping relationship between an address window and an address of an RDMA network interface card.

The interconnection bus 11014 is specifically configured to: determine a first address window to which the address of the to-be-read data belongs, and determine, from the at least one RDMA network interface card based on the first mapping relationship, the first RDMA network interface card corresponding to the first address window.

Optionally, in this embodiment of this application, the interconnection bus 11014 is further configured to manage the memory of the source end device. For example, a part of the memory of the source end device is an RDMA memory. The interconnection bus module may set an attribute of the RDMA memory to support shareable write, that is, support different devices in performing write operations on the RDMA memory.

It may be understood that a process in which the first RDMA network interface card 11012 sends the decapsulated to-be-read data to the processor core 11011 is as follows: The first RDMA network interface card 11012 sequentially passes through the interconnection bus 11014 and the direct access port 11013 to the processor core 11011, and then the processor core 11011 writes the data to the register of the processor core 11011. Then, the processor core 11011 exits the memory read instruction.

Optionally, the first RDMA network interface card is further configured to: after receiving the to-be-read data sent by the second RDMA network interface card, maintain a data structure of a data encapsulation protocol on the first RDMA network interface card. For example, for the RDMA protocol, that the first RDMA network interface card maintains the data structure of the data encapsulation protocol on the first RDMA network interface card includes but is not limited to updating a CQE, a CQC, and a CE. After the to-be-read data is sent to the second RDMA network interface card, the second RDMA network interface card is further configured to maintain a data structure of the data encapsulation protocol on the second RDMA network interface card. For example, for the RDMA protocol, that the second RDMA network interface card maintains the data structure of the data encapsulation protocol on the second RDMA network interface card includes but is not limited to updating a CQE, a CQC, and a CE.

In this embodiment of this application, the direct access port 11013 is specifically configured to: stop the timer if receiving the to-be-read data before the timer expires; or report timeout response information to the processor core 11011 if not receiving the to-be-read data when the timer expires.

Optionally, with reference to FIG. 12, the processor system of the source end device 1101 further includes a memory 11015. The memory 11015 is connected to the interconnection bus 11014. The memory 11015 of the source end device 1101 and the memory 11022 of the destination end device 1102 are addressed uniformly; or the memory 11015 of the source end device 1101 and the memory 11022 of the destination end device 1102 are not addressed uniformly.

In this embodiment of this application, when the memory 11015 of the source end device 1101 and the memory 11022 of the destination end device 1102 are not addressed uniformly, the first RDMA network interface card 11012 is further configured to translate the address of the to-be-read data based on a second mapping relationship. The second mapping relationship is a mapping relationship between a first memory address and a second memory address. The address of the to-be-read data is the first memory address, the first memory address is a mapping address obtained after the memory of the destination end device is mapped to address space of the source end device, a translated destination address is the second memory address, and the second memory address is a local address of the memory of the destination end device. The first RDMA network interface card 11012 is specifically configured to send the memory read instruction to the second RDMA network interface card of the destination end device based on the translated destination address.

Figure 13:
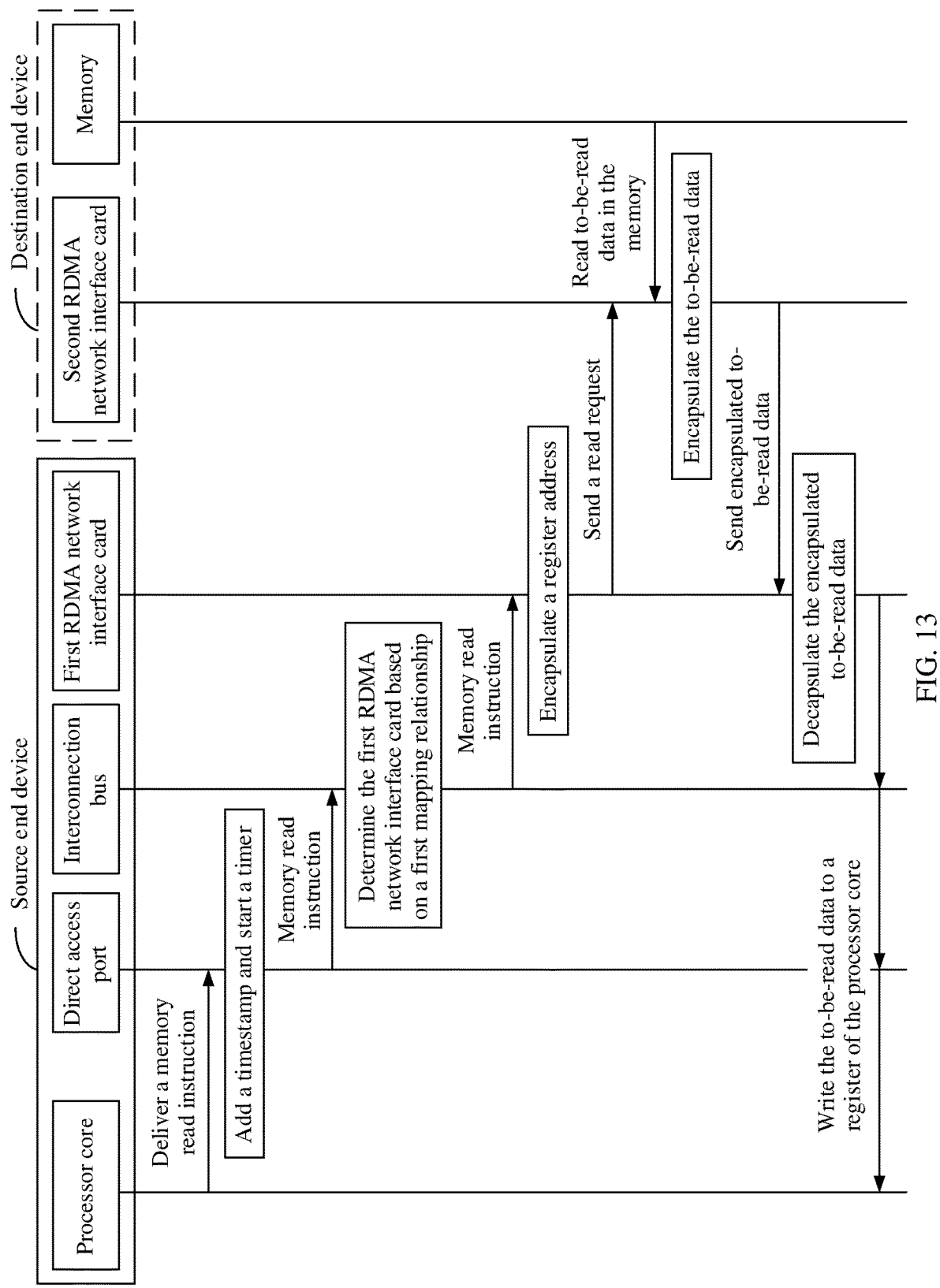
FIG. 13 is a flowchart 2 of a data transmission method according to an embodiment of this application.

Functions of the direct access port 11013 and the interconnection bus 11014 are similar to functions of the direct access port 8015 and the interconnection bus 8013 when the source end device writes data to the memory of the destination end device in the foregoing embodiment. For details, refer to the description of the foregoing embodiment. Details are not described herein again. In addition, the foregoing memory access process may be understood with reference to FIG. 13. Correspondingly, an embodiment of this application provides a data transmission method, including the following steps:

Step 1301: A processor core of a source end device delivers a memory read instruction.

The memory read instruction includes an address of to-be-read data and a register address of the processor core.

Step 1302: A direct access port of the source end device receives the memory read instruction from the processor core, adds a timestamp to the memory read instruction, starts a timer in the direct access port, and sends the memory read instruction to an interconnection bus of the source end device.

Step 1303: The interconnection bus of the source end device receives the memory read instruction from the direct access port, determines a first RDMA network interface card from at least one RDMA network interface card based on a first mapping relationship, and sends the memory read instruction to the first RDMA network interface card.

Step 1304: The first RDMA network interface card of the source end device receives the memory read instruction, and encapsulates the register address based on the address of the to-be-read data in the memory read instruction and configuration information of a destination end device.

Step 1305: The first RDMA network interface card of the source end device sends a read request including an encapsulated register address to a second RDMA network interface card of the destination end device.

Optionally, when a memory of the source end device and a memory of the destination end device are not addressed uniformly, the first RDMA network interface card translates the address of the to-be-read data based on a second mapping relationship. In this way, the first RDMA network interface card sends, based on the translated address, the read request including the encapsulated register address to the second RDMA network interface card of the destination end device.

Step 1306: The second RDMA network interface card of the destination end device receives the read request from the first RDMA network interface card, decapsulates the encapsulated register address, reads the to-be-read data from the memory of the destination end device based on the address of the to-be-read data, and encapsulates the to-be-read data.

Step 1307: The second RDMA network interface card of the destination end device sends encapsulated to-be-read data to the first RDMA network interface card of the source end device.

Step 1308: The first RDMA network interface card of the source end device receives the encapsulated to-be-read data from the second RDMA network interface card, decapsulates the encapsulated to-be-read data, sends decapsulated to-be-read data to the processor core through the interconnection bus and the direct access port, and writes the decapsulated to-be-read data to a register of the processor core.

Optionally, after the first RDMA network interface card receives the to-be-read data sent by the second RDMA network interface card, the first RDMA network interface card maintains a data structure of a data encapsulation protocol on the first RDMA network interface card. After the second RDMA network interface card sends the to-be-read data to the first RDMA network interface card, the second RDMA network interface card maintains a data structure of a data encapsulation protocol on the second RDMA network interface card.

For descriptions of the steps of the data transmission method, refer to the descriptions of the foregoing embodiments. Details are not described herein again.

An embodiment of this application provides a memory access system. In a data read process, a processor core of a source end device sends a memory read instruction to an RDMA network interface card of the source end device. The memory read access instruction carries a memory address (an address of to-be-read data) of a destination end device and a register address of the processor core. Similar to a data write process, the processor core does not need to write the address of the to-be-read data and the register address to a local memory, but sends the memory read instruction to the RDMA network interface card of the source end device. Then, the RDMA network interface card of the source end device sends a read request to an RDMA network interface card of the destination end device. The RDMA network interface card of the destination end device reads the to-be-read data from a memory of the destination end device, encapsulates the to-be-read data, and returns the to-be-read data to the RDMA network interface card of the source end device, so that the RDMA network interface card of the source end device and the processor core implement data exchange. It can be learned that the RDMA network interface card of the destination end device encapsulates the to-be-read data, and maintains a data structure of a communication protocol. Compared with the conventional technology, in this embodiment, a processor core of the destination end device does not need to run complex application software to encapsulate the to-be-read data, and does not need to maintain the data structure of the communication protocol. Therefore, a latency of remote memory access can be reduced. In addition, because the processor core does not need to encapsulate the to-be-read data, overheads of the processor core can be reduced, and computing power resources of the processor core can be saved.

It should be noted that, in this embodiment of this application, after the processor core of the source end device delivers the memory read instruction, in a time period before the to-be-read data is returned to the processor core, the processor core may execute another instruction, so that working efficiency of the processor core can be improved.

Figure 14A:
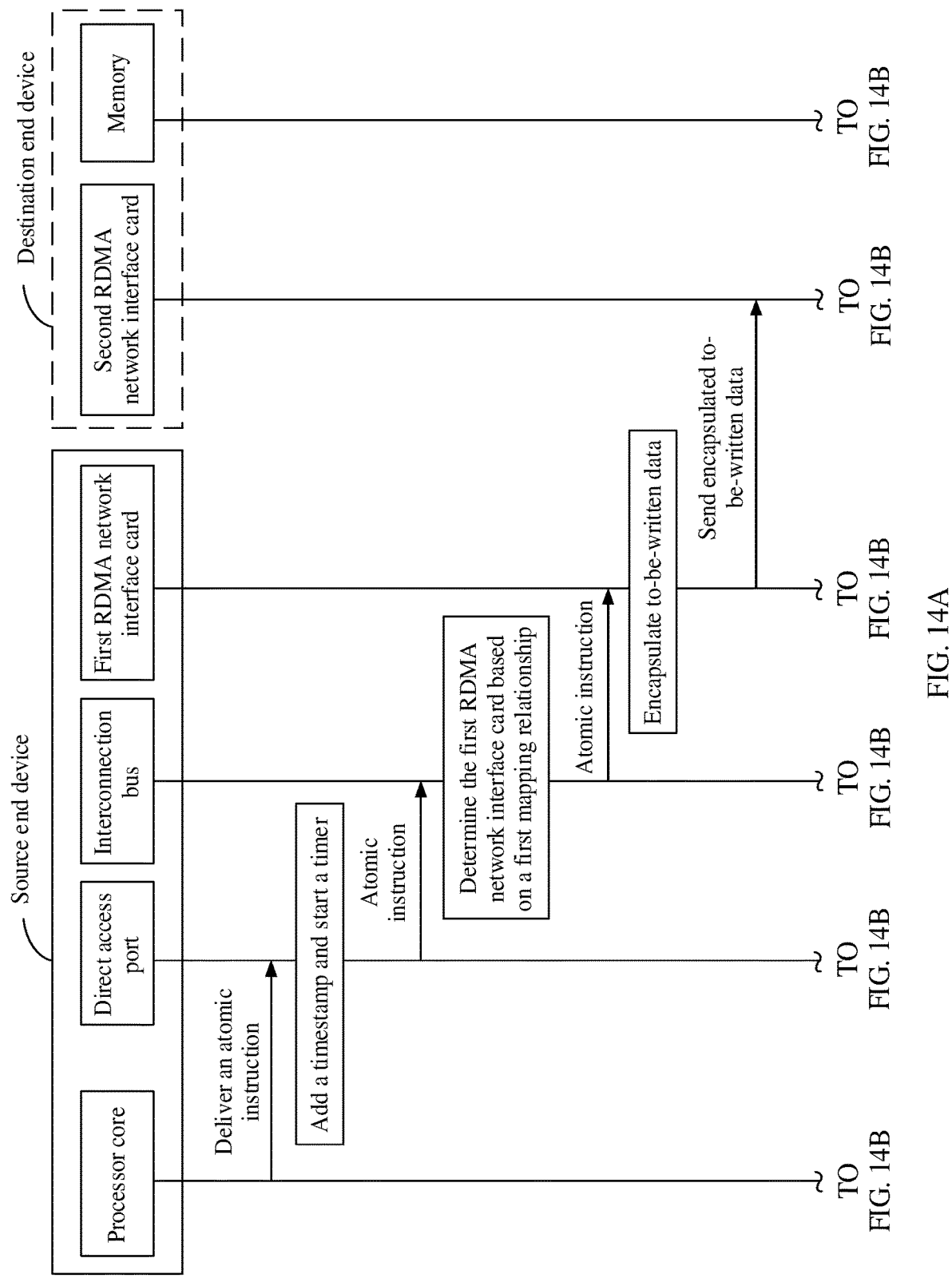
FIG. 14A and FIG. 14B are a flowchart 3 of a data transmission method according to an embodiment of this application.
Figure 14B:
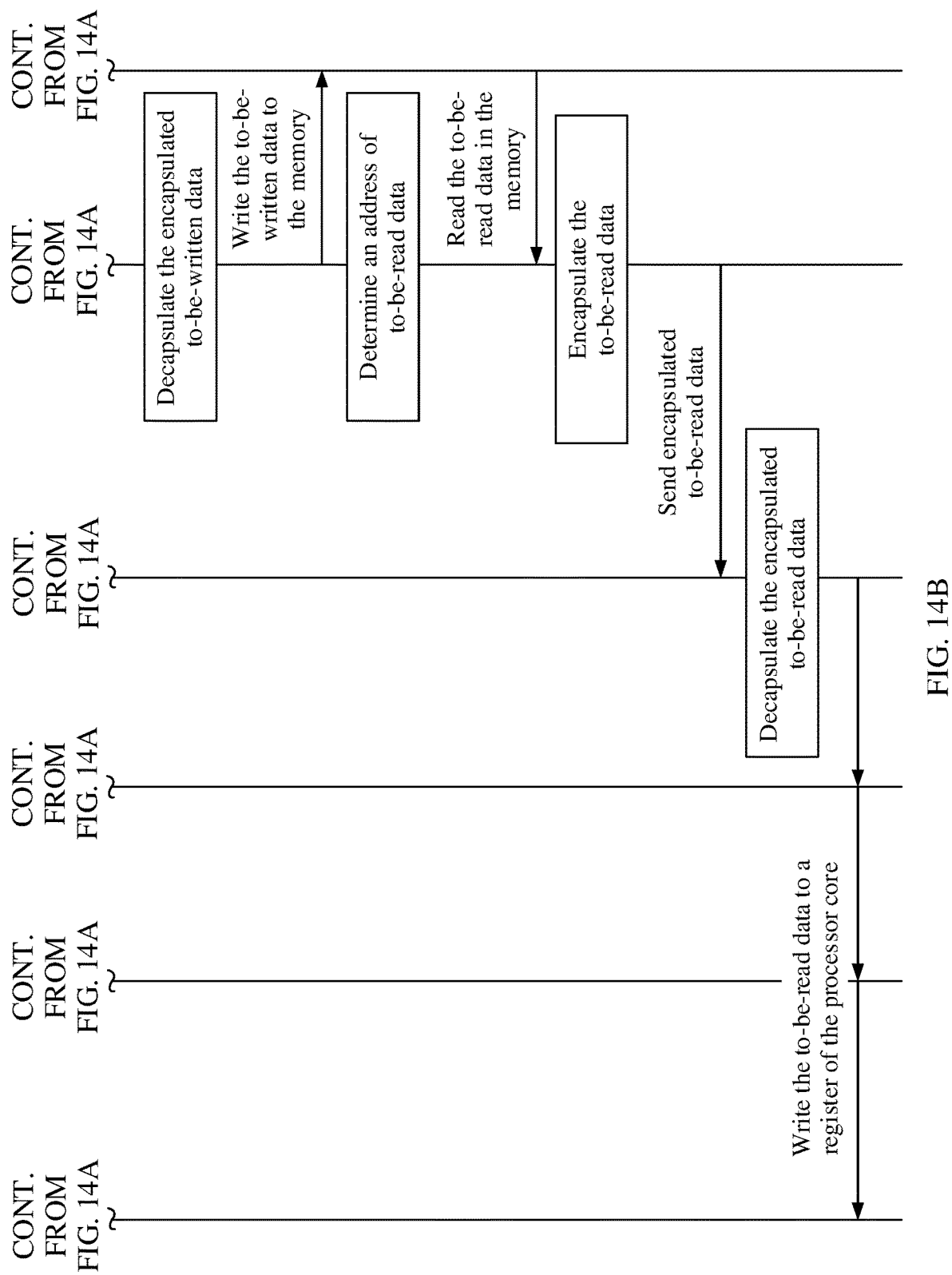

The memory access system provided in this embodiment of this application further supports execution of an atomic instruction by the source end device on the destination end device. The atomic instruction refers to a group of operations. For example, one atomic instruction may be performing a write operation before performing a read operation. For example, the atomic instruction is a write-before-read atomic addition instruction. A process of executing the atomic addition instruction includes: The processor core of the source end device delivers an atomic addition instruction (including to-be-written data, a destination address, an address step, and a register address of the processor core), to write the to-be-written data to memory space corresponding to a destination address of the memory of the destination end device. After the destination end device completes data write, a second RDMA network interface card of the destination end device performs an atomic addition operation on the destination address, to be specific, adds the address step to the destination address, to obtain a new destination address (destination address+address step). Then, the second RDMA network interface card of the destination end device reads data in memory space corresponding to the new destination address, and encapsulates the data, to write the data to a register of the processor core of the source end device. The foregoing memory access (atomic instruction) process is understood with reference to FIG. 14A and FIG. 14B. Correspondingly, an embodiment of this application provides a data transmission method. Specific steps are as following:

Step 1401: A processor core of a source end device delivers an atomic instruction.

The atomic instruction includes to-be-written data in a register of the processor core, a destination address of the to-be-written data, an address step, and a register address of the processor core.

Step 1402: A direct access port of the source end device receives the atomic instruction, adds a timestamp to the atomic instruction, starts a timer in the direct access port, and sends the atomic instruction to an interconnection bus of the source end device.

Step 1403: The interconnection bus of the source end device determines a first RDMA network interface card from at least one RDMA network interface card based on a first mapping relationship, and sends the atomic instruction to the first RDMA network interface card.

Step 1404: The first RDMA network interface card of the source end device receives the atomic instruction, encapsulates the to-be-written data, and sends encapsulated to-be-written data to a second RDMA network interface card of a destination end device.

Step 1405: The second RDMA network interface card of the destination end device decapsulates the to-be-written data, and writes the to-be-written data to memory space corresponding to the destination address of the to-be-written data in the memory of the destination end device.

Step 1406: The second RDMA network interface card of the destination end device determines an address of to-be-read data based on the address step in the atomic instruction and the destination address of the to-be-written data.

The address of the to-be-read data is an address obtained by adding the address step to the destination address of the to-be-written data in the atomic instruction.

Step 1407: The destination end device reads the to-be-read data in the memory space corresponding to the address of the to-be-read data, encapsulates the to-be-read data, and sends encapsulated to-be-read data to the first RDMA network interface card of the source end device.

Step 1408: The first RDMA network interface card receives the encapsulated to-be-read data, decapsulates the to-be-read data, sends decapsulated to-be-read data to the processor core through the interconnection bus and the direct access port, and writes the decapsulated to-be-read data to the register of the processor core.

It should be noted that, for related details of data write and data read procedures involved in the foregoing atomic instruction, refer to detailed descriptions in the foregoing embodiments. Details are not described herein again.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A processor system, applied to a source end device, wherein the processor system comprises a processor core, a first remote direct memory access (RDMA) network interface card, and an interconnection bus, the interconnection bus is connected to the processor core and at least one RDMA network interface card, and the at least one RDMA network interface card comprises the first RDMA network interface card; and wherein:

the processor core is configured to deliver a memory write instruction, wherein the memory write instruction comprises to-be-written data and a destination address of the to-be-written data, the destination address is a memory address of a destination end device, the memory write instruction comprises a first instruction and a second instruction, the first instruction comprises the to-be-written data and a first address, the second instruction comprises the destination address of the to-be-written data and a second address, and the first address and the second address are addresses in a register in the first RDMA network interface card;

the first RDMA network interface card is configured to:
write the to-be-written data to the register in the first RDMA network interface card based on the first address in the first instruction;
write the destination address of the to-be-written data to the register in the first RDMA network interface card based on the second address in the second instruction;

encapsulate, by the first RDMA network interface card, the to-be-written data based on the destination address of the to-be-written data in the register and configuration information of the destination end device; and send, by the first RDMA network interface card, the encapsulated to-be-written data to a second RDMA network interface card of the destination end device, wherein the second RDMA network interface card writes the to-be-written data to a memory of the destination end device; and the interconnection bus is configured to:
receive the memory write instruction delivered by the processor core;
determine, from the at least one RDMA network interface card based on a first mapping relationship, the first RDMA network interface card corresponding to the destination address of the to-be-written data; and
send the to-be-written data to the first RDMA network interface card, wherein the first mapping relationship is a mapping relationship between an address window and an address of an RDMA network interface card.

2. The processor system according to claim 1, wherein:
the first RDMA network interface card is further configured to obtain the configuration information of the destination end device, wherein the configuration information of the destination end device comprises at least one of an address of the destination end device or an address of the second RDMA network interface card.

3. The processor system according to claim 1, wherein the interconnection bus is configured to:
determine a first address window to which the destination address of the to-be-written data belongs; and
determine, from the at least one RDMA network interface card based on the first mapping relationship, the first RDMA network interface card corresponding to the first address window.

4. The processor system according to claim 1, wherein the processor system further comprises a memory, and wherein a memory of the source end device and the memory of the destination end device are not addressed uniformly.

5. The processor system according to claim 4, wherein:
the first RDMA network interface card is further configured to translate the destination address of the to-be-written data based on a second mapping relationship, wherein the second mapping relationship is a mapping relationship between a first memory address and a second memory address, the destination address of the to-be-written data is the first memory address, the first memory address is a mapping address obtained after the memory of the destination end device is mapped to address space of the source end device, the translated destination address is the second memory address, and the second memory address is a local address of the memory of the destination end device; and
the first RDMA network interface card is configured to encapsulate the to-be-written data based on the translated destination address and the configuration information of the destination end device.

6. The processor system according to claim 1, wherein the processor system further comprises a direct access port, and wherein:
the direct access port is configured to:
receive the memory write instruction from the processor core;
add a timestamp to the memory write instruction;
start a timer in the direct access port; and
send the memory write instruction to the interconnection bus.

7. The processor system according to claim 6, wherein: the direct access port is configured to:
stop the timer if receiving a response message of the second RDMA network interface card before the timer expires; or
report timeout response information to the processor core if not receiving a response message of the second RDMA network interface card when the timer expires.

8. The processor system according to claim 7, wherein the first RDMA network interface card is further configured to:
after receiving the response message of the second RDMA network interface card, maintain a data structure of a data encapsulation protocol on the first RDMA network interface card.

9. A memory access system, comprising a source end device and a destination end device, wherein a processor system of the source end device comprises a processor core and a first remote direct memory access RDMA network interface card, and a processor system of the destination end device comprises a second RDMA network interface card and a memory, wherein:
the processor core of the source end device is configured to deliver a memory read instruction, wherein the memory read instruction comprises an address of to-be-read data and a register address, the address of the to-be-read data is a memory address of the destination end device, and the register address is an address in a register of the processor core;
the first RDMA network interface card is configured to:
encapsulate the register address based on the address of the to-be-read data and configuration information of the destination end device; and
send a read request comprising an encapsulated register address to the second RDMA network interface card of the destination end device;
the second RDMA network interface card is configured to:
receive the read request from the first RDMA network interface card;
decapsulate the encapsulated register address;
read the to-be-read data from a memory of the destination end device based on the address of the to-be-read data;
encapsulate the to-be-read data based on the register address and configuration information of the source end device; and
send the encapsulated to-be-read data to the first RDMA network interface card;
after sending the encapsulated to-be-read data to the first RDMA network interface card, maintain a data structure of a data encapsulation protocol on the second RDMA network interface card; and
the first RDMA network interface card is further configured to:
receive the encapsulated to-be-read data from the second RDMA network interface card;
after receiving the encapsulated to-be-read data sent by the second RDMA network interface card, maintain a data structure of a data encapsulation protocol on the first RDMA network interface card;
decapsulate the encapsulated to-be-read data; and
send the decapsulated to-be-read data to the register of the processor core.

10. The memory access system according to claim 9, wherein:
the first RDMA network interface card is further configured to obtain the configuration information of the destination end device, wherein the configuration information of the destination end device comprises at least one of an address of the destination end device or an address of the second RDMA network interface card; and
the second RDMA network interface card is further configured to obtain the configuration information of the source end device, wherein the configuration information of the source end device comprises at least one of an address of the source end device or an address of the first RDMA network interface card.

11. The memory access system according to claim 9, wherein:
the processor system of the source end device further comprises a direct access port and an interconnection bus, the processor core is connected to the interconnection bus through the direct access port, the interconnection bus is further connected to at least one RDMA network interface card, and the at least one RDMA network interface card comprises the first RDMA network interface card;
the direct access port is configured to:
receive the memory read instruction from the processor core;
add a timestamp to the memory read instruction;
start a timer in the direct access port; and
send the memory read instruction to the interconnection bus; and
the interconnection bus is configured to:
receive the memory read instruction from the direct access port;
determine, from the at least one RDMA network interface card based on a first mapping relationship, the first RDMA network interface card corresponding to the address of the to-be-read data; and
send the memory read instruction to the first RDMA network interface card, wherein the first mapping relationship is a mapping relationship between an address window and an address of an RDMA network interface card.

12. The memory access system according to claim 11, wherein the interconnection bus is configured to:
determine a first address window to which the address of the to-be-read data belongs; and
determine, from the at least one RDMA network interface card based on the first mapping relationship, the first RDMA network interface card corresponding to the first address window.

13. The memory access system according to claim 11, wherein the direct access port is configured to:
stop the timer if receiving the to-be-read data before the timer expires; or
report timeout response information to the processor core if not receiving the to-be-read data when the timer expires.

14. The memory access system according to claim 9, configured such that when a memory of the source end device and the memory of the destination end device are not addressed uniformly:
the first RDMA network interface card translates the address of the to-be-read data based on a second mapping relationship, wherein the second mapping relationship is a mapping relationship between a first memory address and a second memory address, the address of the to-be-read data is the first memory address, the first memory address is a mapping address obtained after the memory of the destination end device is mapped to address space of the source end device, the translated address is the second memory address, and the second memory address is a local address of the memory of the destination end device; and the first RDMA network interface card sends, based on the translated address, the read request comprising the encapsulated register address to the second RDMA network interface card of the destination end device.

15. A data transmission method, applied to a source end device, wherein the data transmission method comprises:

delivering, by a processor core of the source end device, a memory write instruction, wherein the memory write instruction comprises to-be-written data and a destination address of the to-be-written data, the destination address is a memory address of a destination end device, the memory write instruction comprises a first instruction and a second instruction, the first instruction comprises the to-be-written data and a first address, the second instruction comprises the destination address of the to-be-written data and a second address, and the first address and the second address are addresses in a register in a first RDMA network interface card;

receiving, by the first RDMA network interface card of the source end device, the memory write instruction;

writing the to-be-written data to the register in the first RDMA network interface card based on the first address in the first instruction;

writing the destination address of the to-be-written data to the register in the first RDMA network interface card based on the second address in the second instruction;

encapsulating, by the first RDMA network interface card, the to-be-written data based on the destination address of the to-be-written data in the register and configuration information of the destination end device;

sending, by the first RDMA network interface card, the encapsulated to-be-written data to a second RDMA network interface card of the destination end device, wherein the second RDMA network interface card writes the to-be-written data to a memory of the destination end device;

receiving, by an interconnection bus of the source end device, the memory write instruction delivered by the processor core;

determining, by the interconnection bus from at least one RDMA network interface card based on a first mapping relationship, the first RDMA network interface card corresponding to the destination address of the to-be-written data, wherein the first mapping relationship is a mapping relationship between an address window and an address of an RDMA network interface card; and sending, by the interconnection bus, the to-be-written data to the first RDMA network interface card.

16. The data transmission method according to claim 15, wherein before the delivering, by a processor core of the source end device, a memory write instruction, the data transmission method further comprises:

obtaining, by the first RDMA network interface card, the configuration information of the destination end device, wherein the configuration information of the destination end device comprises at least one of an address of the destination end device or an address of the second RDMA network interface card.

17. The data transmission method according to claim 15, wherein the data transmission method further comprises:

determining, by the interconnection bus, a first address window to which the destination address of the to-be-written data belongs; and determining, by the interconnection bus from the at least one RDMA network interface card based on the first mapping relationship, the first RDMA network interface card corresponding to the first address window.

* * * * *